US011790400B2

(12) United States Patent
Tosswill et al.

(10) Patent No.: US 11,790,400 B2
(45) Date of Patent: Oct. 17, 2023

(54) SYSTEM AND METHOD FOR TRACKING RECIPIENT INTERACTIONS WITH PHYSICAL, ADVERTISING MAIL

(71) Applicant: ConversionRobots Inc., San Francisco, CA (US)

(72) Inventors: Christopher Tosswill, San Francisco, CA (US); Sam Brewczynski, San Francisco, CA (US); Mark Weaver, San Francisco, CA (US)

(73) Assignee: ConversionRobots Inc., San Francisco, CA (US)

( * ) Notice: Subject to any disclaimer, the term of this patent is extended or adjusted under 35 U.S.C. 154(b) by 0 days.

(21) Appl. No.: 17/949,098

(22) Filed: Sep. 20, 2022

(65) Prior Publication Data
US 2023/0092823 A1 Mar. 23, 2023

Related U.S. Application Data

(60) Provisional application No. 63/341,574, filed on May 13, 2022, provisional application No. 63/246,228, filed on Sep. 20, 2021.

(51) Int. Cl.
*G06Q 30/00* (2023.01)
*G06Q 30/0251* (2023.01)
(Continued)

(52) U.S. Cl.
CPC ..... *G06Q 30/0255* (2013.01); *G06Q 30/0201* (2013.01); *G06Q 30/0242* (2013.01); *G06Q 50/32* (2013.01)

(58) Field of Classification Search
CPC ........... G06Q 30/0255; G06Q 30/0201; G06Q 30/0242; G06Q 50/32
See application file for complete search history.

(56) References Cited

U.S. PATENT DOCUMENTS

| 2009/0144129 A1* | 6/2009 | Grouf | G06Q 30/0273 705/14.42 |
| 2016/0253710 A1* | 9/2016 | Publicover | H04N 21/2187 705/14.66 |
| 2019/0107991 A1* | 4/2019 | Spivack | G09G 5/14 |

OTHER PUBLICATIONS

"An overview of computational challenges in online advertising". IEEE. 2013. (Year: 2013).*
"Interactive electronic advertising". IEEE. 1994. (Year: 1994).*

* cited by examiner

*Primary Examiner* — Maria V Vanderhorst
(74) *Attorney, Agent, or Firm* — Run8 Patent Group, LLC; Peter Miller; Leah Raddatz

(57) ABSTRACT

A method includes: receiving a query from a computing device accessed by a recipient; accessing an identifier, associated with an advertisement card, including a pointer to an electronic document associated with the advertisement card and a recipient code associated with the recipient; accessing a set of recipient profiles associated with target recipients of a set of advertisement cards. The method also includes responsive to the recipient code corresponding to a first recipient profile: accessing a set of recipient characteristics specified by the first recipient profile; deriving an engagement metric, for the recipient interacting with the advertisement card; predicting an intent of the recipient to engage with advertising content related to the advertisement card; assembling a customized advertising experience for presenting to the recipient within a first instance of the electronic document; and triggering the computing device to navigate to the first instance of the electronic document based on the pointer.

19 Claims, 5 Drawing Sheets

(51) Int. Cl.
*G06Q 30/0242* (2023.01)
*G06Q 30/0201* (2023.01)
*G06Q 50/32* (2012.01)
*G05B 19/418* (2006.01)

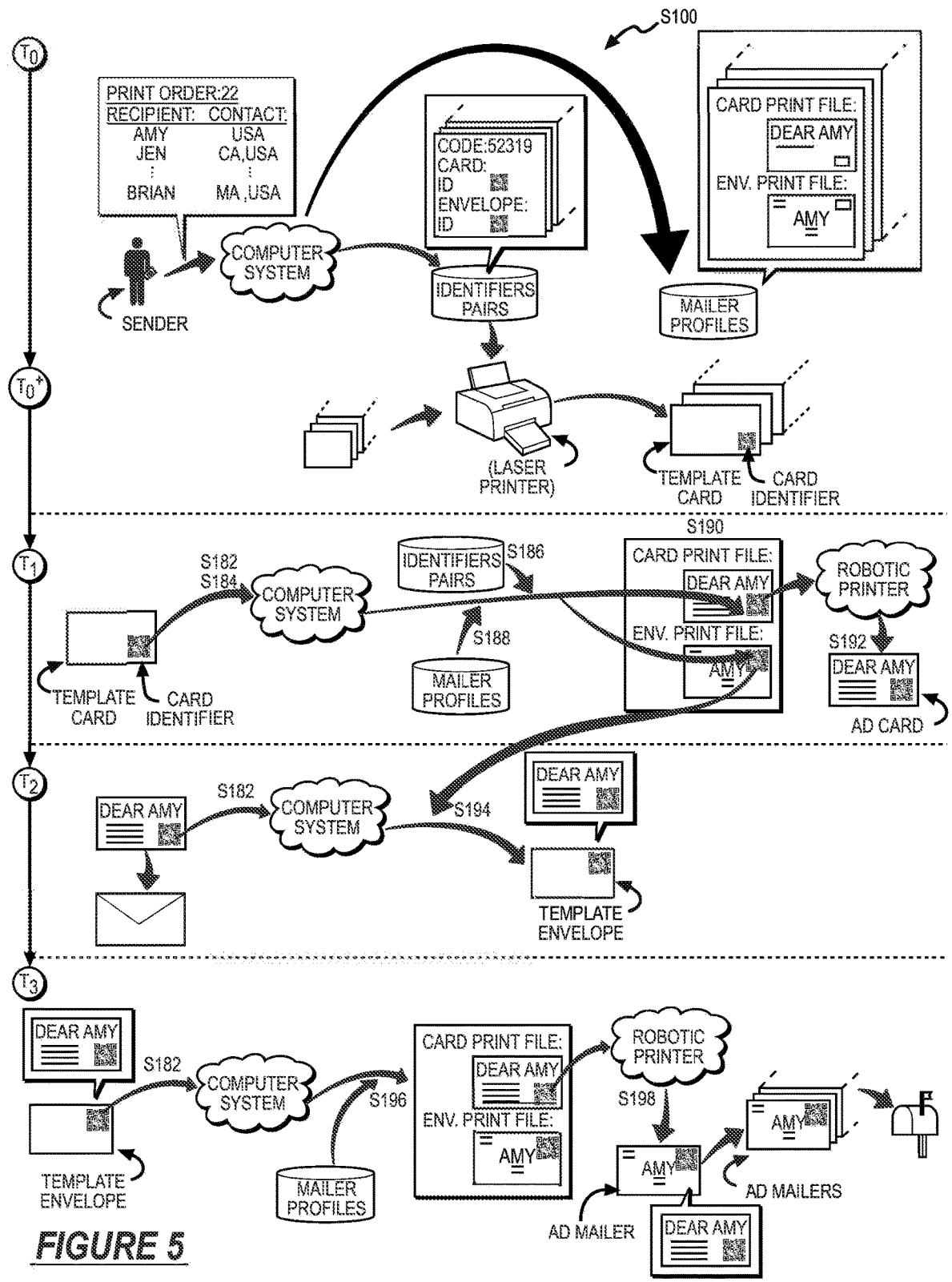

SYSTEM AND METHOD FOR TRACKING RECIPIENT INTERACTIONS WITH PHYSICAL, ADVERTISING MAIL

CROSS-REFERENCE TO RELATED APPLICATIONS

This application claims the benefit of U.S. Provisional Application No. 63/246,228, filed on 20 Sep. 2021, and U.S. Provisional Application No. 63/341,574, filed on 13 May 2022, each of which is incorporated in its entirety by this reference.

TECHNICAL FIELD

This invention relates generally to the field of marketing and more specifically to a new and useful method for tracking user interactions with physical, advertising mail in the field of marketing.

BRIEF DESCRIPTION OF THE FIGURES

FIG. 5 is a flowchart representation of one variation of the first method.

DESCRIPTION OF THE EMBODIMENTS

Figure 1:
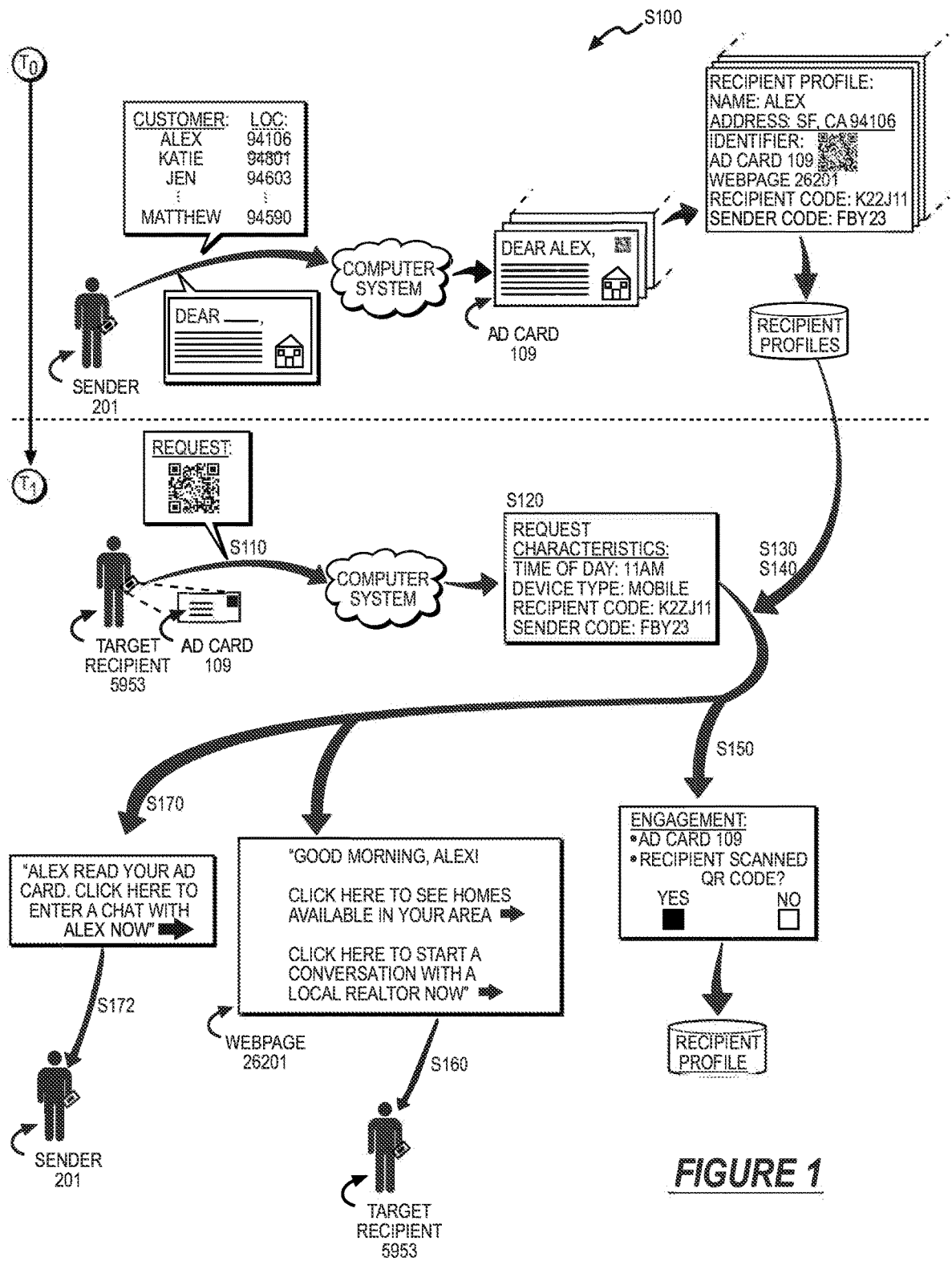
FIG. 1 is a flowchart representation of a first method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1, 2, 3, and 4, a first method S100 includes: receiving a query from a computing device accessed by a first target recipient in Block S110; accessing an identifier, associated with a first advertisement card, in a set of advertisement cards, contained in the query in Block S120, the identifier including a pointer to an electronic document associated with the first advertisement card and a first recipient code associated with the first target recipient; and accessing a set of recipient profiles associated with target recipients of the set of advertisement cards, each recipient profile, in the set of recipient profiles, containing a unique recipient code, in a set of recipient codes including the first recipient code, in Block S130. In response to a first recipient profile, in the set of recipient profiles, containing the first recipient code, the method S100 further includes: accessing a set of recipient characteristics contained in the first recipient profile in Block S140, the set of recipient characteristics including a name of the first target recipient and a first set of contact information associated with the first target recipient; recording a first engagement metric, for the first target recipient interacting with the first advertisement card, to the first recipient profile in Block S150; and triggering the computing device to navigate to a customized instance of the electronic document based on the name of the first target recipient and the pointer in Block S160.

In one variation, in response to the first recipient profile containing the first recipient code, the method S100 further includes: accessing a second set of contact information associated with a sender of the first advertisement card; generating a notification indicating engagement of the first target recipient with the first advertisement card and including the first set of contact information associated with the first target recipient in Block S170; and transmitting the notification to the sender, based on the second set of contact information in Block S172.

One variation of the method S100 includes: in response to a first scan event, initiated at a computing device, that captures an identifier, printed on an advertisement card, in a set of advertisement cards associated with an advertising campaign, receiving a query for advertising content from the computing device in Block S110, the identifier including a pointer to an electronic document associated with the advertising campaign and a recipient code, in a set of recipient codes, linked to the target recipient of the advertisement card; and accessing a set of recipient profiles associated with target recipients of the set of advertisement cards, each recipient profile, in the set of recipient profiles, specifying a particular recipient code, in the set of recipient codes in Block S130. The method S100 further includes in response to the recipient code corresponding to a first recipient profile, in the set of recipient profiles: accessing a set of recipient characteristics specified by the first recipient profile in Block S140, the set of recipient characteristics including a first set of contact information associated with the target recipient; deriving a first engagement metric, for the target recipient interacting with the advertisement card, based on the first scan event in Block S150; predicting a first intent of the target recipient to engage with advertising content related to the advertisement card based on the first engagement metric and the set of recipient characteristics in Block S152; assembling a customized advertising experience for presenting to the target recipient within a first instance of the electronic document in Block S154, based on the first intent, the customized advertising experience including advertising content related to the advertising campaign; and triggering the computing device to navigate to the first instance of the electronic document based on the pointer in Block S160.

One variation of the method S100 includes, during a first time period: in response to a first scan event that captures an identifier, printed on an advertisement card, in a set of advertisement cards associated with the advertising campaign, at a computing device accessed by a first user, receiving a first query for advertising content from the computing device in Block S110, the identifier including a pointer to an electronic document associated with the advertising campaign and a recipient code, in a set of recipient codes, linked to the first user; and accessing a recipient profile, in a set of recipient profiles, including a second recipient code associated with a target recipient and a set of recipient characteristics associated with the target recipient in Block S130. The method S100 further includes, in response to the first recipient code matching the second recipient code: identifying the first user as the target recipient; deriving a first engagement metric, for the target recipient interacting with the advertisement card, based on the first scan event in Block S150; assembling a first advertising experience for presentation to the target recipient within a first instance of the electronic document in Block S154, based on the set of recipient characteristics and the first engagement metric; and triggering the computing device to navigate to the first instance of the electronic document based the pointer in Block S160. The method S100 also includes during a second time period: in response to a second scan event that captures the identifier at the computing device accessed by the target recipient, receiving a second query for advertising content from the computing device in Block S110; deriving a second engagement metric, for the target recipient interacting with the advertisement card, based on the first scan event and the second scan event in Block S150; assembling a second advertising experience for presentation to the target recipient within a second instance of the electronic document in Block S154, based on the set of recipient characteristics and the second engagement metric; and triggering the computing device to navigate to a second instance of the electronic document based on the pointer in Block S160.

One variation of the method S100 includes, during a setup period: generating an identifier in a set of identifiers, for placement on an advertisement card in a set of advertisement cards associated with an advertising campaign in Block S180, the identifier including a pointer to an electronic document associated with the advertising campaign and a recipient code linked to a target recipient of the advertisement card; linking the recipient code to a recipient profile, in a set of recipient profiles, associated with the target recipient in Block S190; and in response to confirming printing of the identifier on the advertisement card, flagging the advertisement card for delivery to the target recipient via physical mailing. The method S100 further includes during a first time period succeeding the setup period: in response to a scan event that captures the identifier, printed on the advertisement card, in the set of advertisement cards, at a computing device accessed by the target recipient, receiving a query specifying the identifier from the computing device in Block S110; in response to the recipient code in the identifier corresponding to the recipient profile, accessing a set of recipient characteristics associated with the target recipient and stored in the recipient profile in Block S130; generating a customized advertising experience for presenting within the electronic document based on the set of recipient characteristics in Block S154; and triggering the computing device to navigate to a customized advertising experience within a first instance of the electronic document based on the pointer in Block S160.

2. Applications

Generally, Blocks of the method S100 can be executed by a computer system (e.g., a remote computer system, a remote server, a local computer) to: generate and record a unique, digitally-readable identifier (e.g., a QR code, a barcode) for placement on a piece of physical, advertising mail (or an "advertisement card") physically delivered (e.g., by mail) to a target recipient by a sender; serve a customized, digital advertising experience (e.g., a customized webpage) to the target recipient responsive to engagement (e.g., scanning of the identifier) of this recipient with the unique, digitally-readable identifier via a local computing device (e.g., mobile phone) accessed by the target recipient; track engagement of the target recipient with the (physical) advertisement card based on the identifier; enable real-time interactions between a sender of this physically-mailed advertisement card and the target recipient responsive to engagement of the target recipient with the identifier; and enable targeted, physical delivery of advertisement cards to the target recipient based on historical engagement of this recipient with advertisement cards containing these unique identifiers.

By generating a unique identifier—linked to a particular advertisement card designated for a particular target recipient—the computer system can enable a sender of this advertisement card to track engagement of the target recipient with the physical advertisement card at any time after delivering (e.g., mailing) the advertisement card. For example, in response to the target recipient scanning the unique identifier—including a pointer to an electronic document (e.g., a configurable webpage) associated with the advertisement card—contained in the advertisement card, the computer system can: configure a customized, digital electronic document (e.g., webpage, landing page within a native application), unique to this particular target recipient, based on the pointer to the original electronic document and recipient information (e.g., name, address, age range) encoded in the identifier and/or stored in a recipient profile associated with the target recipient; and immediately alert the sender regarding this initial engagement between the target recipient and the advertisement card, such as a few days, several months, and/or years after initial delivery of the advertisement card (e.g., as specified by the sender). The computer system can therefore leverage this identifier as a "physical cookie" (e.g., a physical tracking cookie) to track engagement of target recipients with physical ad mail.

Furthermore, by notifying the sender of the advertisement card to contact the target recipient only after confirming engagement of the target recipient with the advertisement card (e.g., via scanning of the identifier), the computer system can maximize exposure of the target recipient to additional advertising content and/or interaction with the sender while minimizing resources allocated (e.g., by the sender) to target recipients that exhibit little or no interest in the advertisement card.

Responsive to the target recipient scanning the identifier (e.g., with a mobile device), the computer system can access information encoded in the identifier to identify: a name, address, age, and/or gender of the target recipient; contact information associated with the target recipient; an identity of the sender of the advertisement card; a format, content type, call-to-action, and/or advertising campaign associated with the advertisement card; etc. The computer system can track this information over time to characterize and/or predict engagement for: this particular target recipient; a group of target recipients (e.g., within a particular region or age range); a particular advertisement card; a particular advertising campaign, a particular advertisement format; a particular call-to-action; etc.

In particular, in one implementation, the computer system can: track engagement of target recipients with advertisement cards and/or digital advertising experiences served to the target recipients over time; and link downstream actions (or "outcomes") executed by target recipients—such as scanning of a QR code printed on the advertisement card, visiting a webpage, contacting a sender of the advertisement card, purchasing of a product or service, attending of an event (e.g., a sale, an open house, a conference), travelling to a business (e.g., in person)—to advertisement cards sent to these target recipients. The computer system can then leverage this corpus of engagement data—representing these outcomes of consumption of advertising content—to identify a particular group or groups of recipients—such as exhibiting similar user characteristics—that are more likely to engage with advertisement cards and/or more likely to perform a particular outcome responsive to viewing of advertising content presented to the user (e.g., in a physical advertisement card and/or in a digital advertising experience), such that advertisement card senders may selectively distribute future advertisement cards to a targeted group of users that may be more likely to engage with content presented in and/or related to these advertisement cards.

The method S100 is described herein as executed by the computer system to serve personalized advertising content to a user responsive to a scan event that captures an identifier printed on an advertisement card (e.g., physical, printed advertising mail), such as printed on a postcard, a greeting card, a letter, a flyer, and/or catalog. However, the computer system can similarly execute Blocks of the method S100 to serve personalized advertising content to a user responsive to a scan event that captures an identifier printed or rendered on any type of personalized "advertisement card" or medium (e.g., a physical or digital medium), such as printed or (digitally) rendered within an email, a text message, a webpage, and/or on a billboard, a package, a ticket, a receipt, a name placard at an event (e.g., conference, wedding, etc.), etc.

3. EXAMPLE

In one example, a realtor may send a set of advertisement cards to potential customers (e.g., potential homebuyers) in a particular region. During a setup period, the computer system can receive content from the user—such as via a user portal accessed within a native application executing on her computing device—for generating the set of advertisement cards, including: advertising content—such as a static advertisement (e.g., images of homes in a particular area) and/or a call to action ("Schedule a showing today!")—for placement on the set of advertisement cards; a text string (e.g., a block of text containing general information about the realtor's business and/or homes advertised); and contact information (e.g., name, address, phone number, email address) for a set of customers (i.e., target recipients) to whom the realtor plans to send the set of advertisement cards. The computer system can then generate a primary advertisement card including advertising content and the text string received from the realtor.

Then, for a first customer, in the set of customers, the computer system can: generate a copy of the primary advertisement card; access a set of contact information—including a name and an address—associated with the first customer; input the name of the first customer at a beginning of the copy of the primary advertisement card; and generate a unique QR code associated with the first customer and linked to a webpage associated with the primary advertisement card. In particular, the QR code can include the set of contact information and a pointer to the webpage encoded (e.g., encrypted) within the QR code, such that when the customer later scans this unique QR code (e.g., with her mobile device), the computer system can decrypt the QR code to: read the set of contact information and therefore identify the customer corresponding to the unique QR code; and read the pointer to direct the user to the webpage.

The computer system can then append the copy of the primary advertisement card with the unique QR code, associated with the first customer, to generate a first advertisement card. The computer system can then repeat this process for each customer, in the set of customers, to generate the set of advertisement cards (e.g., copies of the primary advertisement card), each advertisement card, in the set of advertisement cards, linked to a particular customer, in the set of customers. The user may then print the set of advertisement cards—each advertisement card, in the set of advertisement cards, addressed to a customer, in the set of customers, and including a unique QR code associated with that customer—and deliver these advertisement cards to her customers (e.g., via physical mailing).

Later, during a live period succeeding the setup period, the first customer may receive the first advertisement card in her mailbox. If the first customer is interested in contents of the first advertisement card, she may scan the QR code via her mobile device to access additional information related to the first advertisement card. Then, in response to the first customer scanning the QR code (or "the first scan event"), the computer system can: receive a customer query including the QR code; decrypt the QR code associated with the first customer (e.g., target recipient); and access a set of recipient characteristics contained in the first recipient profile, the set of recipient characteristics including the name and the set of contact information associated with the first customer (e.g., address of the first customer) and/or the pointer to the webpage associated with the advertisement card.

The computer system can then: update a first instance of the webpage based on the name and the address of the first customer to generate a customized instance of the webpage, tailored to the first customer, such as by including her name in a header on the customized instance of the webpage and/or by including advertising content related to available homes proximal her address (e.g., within 10 miles); and trigger the mobile device of the user to navigate to this customized instance of the webpage (e.g., customized specifically for the first customer).

Additionally, the computer system can characterize engagement of the first customer interacting with advertising content associated with the first advertisement card. In particular, in this example, in response to receiving the customer query, the computer system can record a set of query characteristics including: the name of the first customer; the address of the first customer; a time of day at which the first customer scanned the QR code; a type of operating system of the mobile device; a location of the mobile device at the time of day; etc.

Furthermore, the computer system can also record a set of outcome characteristics representative of downstream actions performed by the first customer after receiving the first advertisement card. In particular, in this example, the computer system can record a set of outcome characteristics including: whether the first customer scanned the QR code; whether the first customer contacted the realtor; whether the first customer hired the realtor; whether the first customer purchased a home from the realtor; etc. The computer system can then compile the set of query characteristics and/or the set of outcome characteristics to characterize engagement of the first customer with the first advertisement card. The realtor may then leverage this engagement to inform future advertisement cards or general advertising targeted to this first customer and/or to other customers exhibiting similar characteristics (e.g., demographics).

4 Scan Event

The computer system can implement Blocks of the method S100 in response to a scan event—such as scanning of a printed identifier (e.g., QR code) by a target recipient via a computing device (e.g., a mobile device) to track recipient interactions with advertising mail associated with an advertising campaign.

More specifically, responsive to a scan event (e.g., target recipient scanning a QR code) that captures an identifier (e.g., QR code), printed on an advertisement card, in a set of advertisement cards associated with an advertising campaign, at a computing device accessed by a target recipient, the computer system can receive a request (or "query") containing the identifier (e.g., QR code) from the computing device. The identifier (e.g., QR code) can include: a pointer to an electronic document (e.g., webpage within a web browser, landing page within a native application) associated with the advertising campaign; and a recipient code linked to the target recipient.

4.1 Unique Identifier

The computer system can generate a unique identifier (e.g., QR code), associated with a target recipient, for placement on an advertisement card, associated with an advertising campaign, assigned to the target recipient. This identifier can also include a pointer to an electronic document (e.g., a webpage, a PDF file, a landing page within a native application) associated with the advertisement card.

In one implementation, during a setup period (e.g., preceding a first scan event), the computer system can generate an identifier, for placement on an advertisement card, including: a pointer to an electronic document associated with an advertising campaign; and a recipient code (e.g., a randomly generated text string) linked to the target recipient of the advertisement card, thereby linking the advertisement card and identifier to the target recipient. The computer system can then store this identifier—including the recipient code—in a recipient profile, in a set of recipient profiles, associated with the target recipient. The computer system and/or sender of the advertisement card can then: append the advertisement card with the identifier; and generate the advertisement card for delivery to the target recipient via physical mailing.

Later, during a live period succeeding the setup period, in response to a first scan event (e.g., the target recipient scanning the identifier via mobile phone), the computer system can: receive a query—including the recipient code and the pointer to the electronic document—from a computing device (e.g., a mobile device) accessed by the target recipient; access the set of recipient profiles; and identify the target recipient based on the recipient code contained in both the query and the recipient profile. The computer system can then: leverage identifying information (e.g., name, address, gender, age) contained in the recipient profile and the pointer to the electronic document to generate a customized instance of the electronic document; and trigger the computing device to navigate to this customized instance of the electronic document.

Alternatively, in another implementation, during the setup period, the computer system can generate an identifier including: a pointer to the electronic document associated with the advertisement card; and an encrypted recipient code (e.g., an encrypted name of the target recipient) linked to the target recipient and including a set of recipient characteristics associated with the target recipient (e.g., identifying information for the target recipient of the advertisement card). The computer system and/or sender of the advertisement card can then: append the advertisement card with the identifier; and deliver (e.g., via physical mail) the advertisement card to the target recipient.

Later, during the live period, in response to a first scan event (e.g., the target recipient scanning the identifier), the computer system can: receive a query—including the encrypted recipient code and the pointer to the electronic document—from a computing device accessed by the target recipient; decrypt the encrypted recipient code to access the set of recipient characteristics associated with the target recipient (e.g., identifying information for the target recipient); identify the target recipient based on the decrypted recipient code; generate a customized instance of the electronic document for the target recipient based on the pointer and identifying information contained in the recipient code of the identifier; and trigger the computing device to navigate to this customized instance of the electronic document.

Thus, in this implementation, by encoding identifying information of the target recipient directly within the identifier (e.g., QR code), the computer system can read this identifying information directly from the identifier to identify the target recipient—without accessing an externally-stored identifier "key" (e.g., the set of recipient profiles)—thereby: minimizing latency to generate the customized instance of the electronic document and/or direct the target recipient to this customized instance of the electronic document; and increasing a likelihood that the target recipient will engage with content at the customized instance of the electronic document.

Additionally and/or alternatively, in another implementation, during the setup period, the computer system can: generate the identifier in the set of identifiers; receive a first query for a card print file to pair with a first template card, in a set of template cards, generated for a print order and loaded at a robotic system; identify a first card identifier, in a set of card identifiers, printed on the first template card; access a first envelope identifier, in a set of envelope identifiers, linked to the first card identifier in the set of card identifiers; select a first recipient, from a list of recipients defined for the print order, for assigning to the first card identifier; store the identifier in the set of identifiers, with the recipient code, in a recipient profile, in a set of recipient profiles, associated with the target recipient; link the first card identifier and the first envelope identifier to a first mailer profile, in a set of mailer profiles, associated with the first recipient; retrieve a first card print file, in a set of card print files generated for the print order, stored in the first mailer profile and corresponding to recipients in the list of recipients; receive a second query for an envelope identifier, in the set of envelope identifiers, for printing on a first template envelope, in a set of template envelopes, paired with the first advertisement card; retrieve the first envelope identifier linked to the first card identifier; trigger printing of the first envelope identifier on the first template envelope; retrieve a first envelope print file, in the set of print files, stored in the first mailer profile; and in response to confirming printing of the identifier on the advertisement card, flagging the advertisement card for delivery to the target recipient via physical mailing.

Then, the computer system can: load the first card print file onto the robotic system for pairing with the first template card to print the advertisement card, in the set of advertisement cards, for the first recipient, according to the first card print file; load the first envelope print file onto the robotic system for pairing with the first template envelope for printing of a first addressed envelope according to the first envelope print file; insert the advertisement card, in the set of advertisement cards, into the first addressed envelope for delivery to the target recipient via physical mail; and generate the advertisement card for delivery to the target recipient via physical mailing, as further described below.

Thus, in this implementation, the computer system can link a card identifier and an envelope identifier to enable tracking and/or identification of any ad mailer generated for the print order and matching of contents printed on the envelope (e.g., name and/or address of a recipient) to contents of a particular advertisement card—tailored to a particular recipient—loaded within the envelope.

4.2 Recipient Code

The identifier (e.g., QR code) can include a recipient code (e.g., a randomly-generated recipient code, an encrypted recipient code) associated with characteristics (e.g., name, geographic location, age) of the target recipient of an advertisement card including this identifier.

In one implementation, as described above, the identifier (e.g., QR code) can include a recipient code defining a randomly-generated character string (previously) assigned to a particular target recipient. In this implementation, the computer system can record this randomly-generated character string in a database (e.g., in the recipient profile), linked to the target recipient, to enable identification of the target recipient responsive to receiving a query including the identifier. Alternatively, in another implementation, as described above, the identifier (e.g., QR code) can include a recipient code defining an encrypted character string corresponding to characteristics of the target recipient. In this implementation, the computer system and/or computing device of the target recipient can decrypt the encrypted character string to directly "read" identifying information (e.g., name, address) of the target recipient from the recipient code responsive to receiving the query including the identifier.

The recipient code can include a subset of character strings, each character string in the subset of character strings associated with characteristics of the target recipient. For example, for a first advertisement card designating a first target recipient, the computer system can generate a first QR code including a first recipient code including: a first character string associated with an identity (e.g., name, date of birth) of the target recipient; a second character string associated with a first address of the target recipient; a third character string associated with a first age range of the target recipient; and a fourth character string associated with a first gender of the target recipient.

Therefore, when the first target recipient receives the first advertisement card and scans the QR code (e.g., with her mobile device), the computer system can: receive a first query including the first QR code; and read the first recipient code, including the first, second, third, and fourth character strings. The computer system can therefore identify the target recipient, the location of the target recipient, the age range of the target recipient, and the gender of the target recipient associated with the first query and link this data to the first query.

The computer system can then leverage information contained in these character strings to: generate a customized instance of a webpage, linked to the QR code, for the target recipient; and inform future interactions with this target recipient and other target recipients—exhibiting similar demographics (e.g., location, age range, or gender) as the first target recipient—based on the character strings and the first target recipient's engagement with the advertisement card. In particular, in this example, in response to receiving the first query, the computer system can: generate a first engagement metric (e.g., a binary "YES" or "NO", an integer, a score) indicative of whether the target recipient scanned the first QR code (e.g., within a threshold duration of delivery of the advertisement card); access a first recipient profile, in a set of recipient profiles, associated with the first target recipient (e.g., based on the first character string); access a first location profile, in a set of location profiles, associated with the first location (e.g., based on the first character string); access a first age range profile, in a set of age range profiles, associated with the first age range (e.g., based on the first character string); and access a first gender profile, in a set of gender profiles, associated with the first gender (e.g., based on the first character string). The computer system can then store this first engagement metric in the first target recipient profile, the first location profile, the first age range profile, and the first gender profile.

4.2.1 Sender Code

Additionally, in one variation, the identifier can further include a sender code associated with characteristics of a sender of the advertisement card.

In particular, in the preceding example, the first QR code can include a fifth character string associated with the sender of the first advertisement card. Later, in response to receiving the first query, the computer system can identify the sender of the advertisement card and similarly link this data to the first query by storing the first engagement metric in a first sender profile, in a set of sender profiles, associated with the first sender. The computer system can therefore enable the sender to track advertisement cards and/or engagement of target recipients with advertisement cards sent by the sender.

In another example, the identifier (e.g., QR code) can include a sender code containing a set of contact information and characteristics associated with the sender of the advertisement card. In this example, the computer system can: receive the query containing the identifier (e.g., QR code) from a computing device, the identifier (e.g., QR code) including the pointer to the electronic document associated with the advertising campaign, the recipient code linked to the target recipient, and a sender code containing a set of sender characteristics (e.g., contact information, name, address, age, gender, etc.). Then, in response to the scan event, the computer system can: generate a notification indicating a level of engagement of the target recipient with the advertisement card (e.g., low, moderate, high), the notification including the set of contact information associated with the target recipient (stored in the recipient profile); and transmit the notification to the sender for review according to the sender code (e.g., contact information of the sender).

Therefore, the identifier (e.g., QR code) can include a sender code associated with characteristics of a sender of the advertisement card and the computer system can send notifications to the sender based on the sender code, thereby immediately alerting the sender regarding the level of engagement between the target recipient and the advertisement card.

4.2.2 Advertisement Code

Additionally, in another variation, the identifier (e.g., QR code) can further include an advertisement code associated with characteristics of the advertisement card (e.g., advertising campaign, advertisement format, type of content advertised, delivery period) and/or an advertising campaign including the advertisement card.

In particular, in the preceding example, the first QR code can include a sixth character string associated with characteristics of the advertisement card. Later, in response to receiving the first query, the computer system can identify a format of the advertisement card based on the sixth character string and similarly link this data to the first query by storing the first engagement metric in a first advertisement card profile, in a set of advertisement card profiles, associated with the advertisement card.

In another example, in response to the first scan event, the computer system can receive a query containing the identifier (e.g., QR code) from the computing device, the identifier (e.g., QR code) including an advertisement code specifying a format of the advertisement card (e.g., a brochure for an open house). The computer system can then implement Blocks of the method S100 to derive the first engagement metric, for the target recipient interacting with the advertisement card, based on a first scan event and the format of the advertisement card (e.g., a brochure for an open house); and store the first engagement metric in an advertisement card profile, in a set of advertisement card profiles, associated with the advertisement card in the set of advertisement cards. Furthermore, in response to the first scan event, the computer system can: access a set of contact information associated with a sender of the advertisement card; generate a notification indicating detection of the first scan event and engagement of the first target recipient with the format of the advertisement card (e.g., a brochure for an open house), the notification including a second set of contact information associated with the target recipient; and transmitting the notification to the sender for review of engagement of the first target recipient with the format of the advertisement card (e.g., a brochure for an open house), based on the set of contact information associated with the sender.

Therefore, the computer system can enable the sender and/or advertiser to track engagement of target recipients with an advertisement card and/or with a particular format of the advertisement card.

4.3 Pointer—Customized Electronic Document

The identifier can include a pointer to an electronic document (e.g., webpage within a web browser, landing page within a native application) associated with the advertisement card. Upon receiving a query including the identifier, the computer system can: extract recipient information (e.g., name, address, age) from a recipient code included in the identifier; and leverage this recipient information to generate a customized instance of the electronic document tailored to a target recipient of the advertisement card.

For example, in response to receiving a query including an identifier, the computer system can: extract a recipient code from the identifier; and identify a name of the target recipient of an advertisement card including the identifier based on the recipient code; access a URL (i.e., pointer) contained in the identifier (e.g., encrypted within the identifier) of a webpage associated with the advertisement card; and modify the URL to link to a customized instance of the webpage based on the name of the target recipient. In particular, in one example, the computer system can modify the URL by tagging the name of the target recipient (e.g., "ALEX") to an end of the URL, such as by modifying the URL "www.ABC123.com" to recite "www.ABC123.com/ALEX". Thus, in this example, when the target recipient scans the QR code with his mobile device, the computer system can trigger the target recipient's mobile device to navigate to the customized instance of the webpage including a heading reciting "Hello Alex!" via the modified URL.

Additionally, the computer system can leverage query characteristics to modify the pointer and generate a customized instance of the electronic document associated with the advertisement card. In particular, in the preceding example, in response to receiving the query, the computer system can: access a set of query characteristics including: a time of day; a device type (e.g., mobile, desktop, operating system) of a computing device associated with the query; a geographic location of the computing device; etc. The computer system can then leverage the set of query characteristics—in addition to the name of the target recipient—to further modify the URL contained in the identifier such as by modifying the URL "www.ABC123.com" to recite "www.ABC123.com/ALEX/AM/MOBILE". Thus, in this example, when the target recipient (e.g., "Alex") scans the QR code with his mobile device before 10 AM (e.g., in the geographic location of the mobile device) the computer system can trigger the target recipient's mobile device to navigate to the customized instance of the webpage—formatted for rendering on the mobile device—including a heading reciting "Good morning, Alex!" via the modified URL.

Further, in one implementation, by linking the electronic document to the identifier, the computer system enables the sender to update and/or replace the electronic document (e.g., over time) linked to the identifier. For example: the computer system can generate a set of advertisement cards designating a set of target recipients in preparation for a new ad campaign. During a setup period for the new ad campaign, the computer system can: generate a set of identifiers for the set of advertisement cards, each identifier, in the set of identifiers, including a pointer (e.g., a text string) linked to a first webpage associated with the new advertising campaign. In particular, in this example, the computer system can generate the batch of advertisement cards by: generating a set of copies of a primary advertisement card (e.g., uploaded by the sender); and injecting each copy, in the set of copies, with a name of a target recipient, in the set of target recipients. Then, for each identifier, in the set of identifiers, the computer system can: generate an ad campaign profile, in a set of ad campaign profiles, associated with the new ad campaign; and store each identifier, in the set of identifiers, in the ad campaign profile.

Further, the computer system can: store the first pointer—included in each identifier in the set of identifiers—in the ad campaign profile; and store a first URL corresponding to the first webpage in the advertising campaign profile, linked to the first pointer. Later, at a first time during a live period, when a first target recipient, in the set of target recipients, scans a first identifier, in the set of identifiers, included in a first advertisement card, in the set of advertisement cards, the computer system can: receive a first query including the first identifier; access the first pointer included in the first identifier; access the advertising campaign profile, based on the first pointer; and trigger a computing device—accessed by the first target recipient—to navigate to the first webpage based on the URL linked to the first pointer in the advertising campaign profile.

Later, at a second time succeeding the first time during the live period, the sender and/or advertiser associated with the new advertising campaign may plan to update the webpage linked to the new advertising campaign. In this example, the computer system and/or sender can: access the advertising campaign profile; replace the first URL corresponding to the first webpage with a second URL corresponding to a second webpage associated with the advertising campaign; and link this second URL to the pointer included in the set of identifiers. Then, at a third time succeeding the second time, during the live period, in response to a second instance of the first target recipient scanning the first identifier, the computer system can: receive a second query including the first identifier; access the first pointer included in the first identifier; access the advertising campaign profile based on the first identifier; and trigger the computing device accessed by the first target recipient to navigate to the second webpage based on the second URL linked to the first pointer in the advertising campaign profile.

Alternatively, in another example, the computer system can generate an identifier including an encrypted URL as the pointer (e.g., directly encoded in the identifier) to a webpage associated with an advertising campaign. In this example, a sender or advertiser associated with the advertising campaign can update content at this webpage over time to adjust the advertising campaign.

4.3.1 Time Limited Advertising Content

In one variation, the advertisement code can include content (e.g., a promotion, discount code, a gift card, etc.) related to an advertising campaign (e.g., direct mail real estate advertising) that is available to a target recipient for a limited amount of time, as defined by a sender of the advertisement card, (e.g., 12 hours, one month, one day).

For example, in response to a scan event, the computer system can: receive a query containing an identifier (e.g., QR code) from a computing device, the identifier (e.g., QR code) including an advertisement code linked to a promotion (e.g., 10% off discount code) associated with an advertising campaign (e.g., a real estate campaign) and a time limit (e.g., 24 hours), selected by a sender (e.g., realtor) of an advertisement card in a set of advertisement cards associated with the advertising campaign; trigger the computing device (e.g., mobile device) to navigate to a first instance of an electronic document associated with the advertising campaign; initiate a timer for the duration of the time limit (e.g., 24 hours) for the promotion (e.g., 10% off discount code) within the first instance of the electronic document, according to the advertisement code; and render the timer, for the duration of the time limit (e.g., 24 hours), within the first instance of the electronic document for the target recipient at the computing device (e.g., mobile device); and in response to expiration of the timer, deactivate the promotion associated with the advertising campaign.

Thus, the computer system can trigger the target recipient's mobile device to navigate to the customized instance of a webpage—formatted for rendering on the mobile device—including time limited content related to the advertising campaign and thereby enables the sender to increase engagement between a target recipient and an advertisement card with promotional advertising content.

4.4 Real-Time Interactions Between Sender & Target Recipient

In one implementation, the computer system can enable interactions (e.g., communication) between the sender of the advertisement card and the target recipient responsive to receiving a query associated with the advertisement card.

For example, a sender may deliver an advertisement card to a target recipient, the advertisement card including an identifier linked to the target recipient, the sender, and an electronic document associated with the advertisement card. In particular, the identifier can include: a first character string associated with the target recipient; a second character string associated with the sender; and a third character string (i.e., a pointer) associated with an electronic location (e.g., a URL) of the external document.

In response to receiving a query—including the identifier—from a computing device accessed by the target recipient, the computer system can: identify the target recipient based on the first character string; identify the sender based on the second character string; and trigger the computing device to navigate toward a customized instance of the electronic document—personalized for the target recipient—based on the first and third character strings.

Additionally, the computer system can: access a sender profile, in a set of sender profiles, associated with the sender based on the second character string; access a phone number and/or email address of the sender contained in the sender profile; generate a notification indicating that the target recipient scanned the identifier; and transmit the notification to the phone number and/or email address of the sender in (near) real-time, such as while the target recipient browses the customized instance of the electronic document. Additionally and/or alternatively, in this example, the computer system can notify the user via a sender portal—executing on the sender's computing device—within the native application.

Further, the computer system can include contact information for the target recipient in this notification transmitted to the sender. In particular, in this example, the computer system can: access a recipient profile, in a set of recipient profiles, associated with the target recipient based on the first character string; access a phone number and/or email address of the target recipient contained in the recipient profile; generate the notification indicating scanning of the identifier by the target recipient and including the name, phone number, and/or email address of the target recipient; and transmit this notification to the sender. The sender may then contact the target recipient (e.g., in real-time).

Alternatively, in another example, the computer system can enable real-time communication between the sender and the target recipient at the customized instance of the electronic document, such as within a chat window loaded within the customized instance of the electronic document. For example, in response to receiving the query—including the identifier—from the computing device accessed by the target recipient, the computer system can trigger the computing device to navigate toward the customized instance of the electronic document and generate a notification (e.g., a push notification): indicating that the target recipient scanned the identifier and is currently browsing the customized instance of the electronic document; and including a link to a chat window within a sender portal (e.g., within the native application) configured to enable real-time communication between the sender and the target recipient. The computer system can then transmit this notification to the sender (e.g., via text message, via the native application).

Then, in response to the sender selecting the link, and thereby accessing the chat window, the computer system can trigger the computing device to render an instance of the chat window within the customized instance of the electronic document. The sender may then message the target recipient via the chat window in (near) real-time. Additionally and/or alternatively, in this example, the computer system can trigger the computing device to immediately render the chat window upon rendering the customized instance of the electronic document at the computing device. In this example, the computer system can trigger a "chat bot" to automatically initiate communication with the target recipient. However, once the sender accesses the chat window, the computer system can disable this "chat bot" and enable the sender to communicate directly with the target recipient.

The computer system can therefore enable increased engagement by the target recipient with the advertisement card and/or sender of the advertisement card after the target recipient exhibits a threshold level of engagement. In particular, in the preceding example, by notifying the sender of the advertisement card to contact the target recipient only after receiving confirmation that the target recipient scanned the identifier (e.g., QR code) included in the advertisement card, the computer system can: minimize resources allocated (e.g., by the sender) to target recipients that exhibit little or no interest in the advertisement card; minimize disruption to target recipients that exhibit little or no interest in the advertisement card; and maximize exposure of target recipients exhibiting engagement with the advertisement card to additional advertising content and/or interactions with the sender related to the advertisement card.

5. Multiple Scan Events

In one variation, the computer system can select a different advertising experience—such as including different advertising content associated with an advertising campaign, including similar advertising content presented in different advertising formats, and/or including advertising content associated with different advertising campaigns—for presentation to a user (e.g., the target recipient and/or another user scanning the identifier) responsive to each scan event associated with the identifier (e.g., each time the identifier is scanned by a user).

In particular, in this variation, the computer system can, at a first time: detect a first scan event for an identifier (e.g., a QR code) at a computing device accessed by a target recipient; and assemble (e.g., select, generate) a first customized advertising experience for the first scan event. Later, at a second time succeeding the first time, the computer system can detect: a second scan event of the identifier (at the computing device (e.g., accessed by the same target recipient) based on a device identifier (e.g., IP address); and assemble a second customized advertising experience—such as an updated or modified version of the first customized advertising experience, a new customized advertising experience distinct from the first customized advertising experience, and/or a second instance of the first customized advertising experience—for the second scan event. The computer system can similarly assemble additional customized advertising experiences for presenting to the user during subsequent scan events (e.g., a third scan event, a fourth scan event, a tenth scan event).

The computer system can therefore detect multiple scan events for an identifier (e.g., QR code), such as entered by the target recipient, and assemble a customized advertising experience for presentation to the user for each scan event for the user.

5.1 Engagement Metrics

Based on scanning of the identifier by the recipient, the computer system can derive a set of engagement metrics indicative of user engagement with the advertisement card. For example, the computer system can derive an engagement metric—such as a binary "YES" or "NO", a qualitative metric or score (e.g., "highly-engaged", "moderately engaged" and/or "unengaged"), a quantitative metric or score (e.g., "5/10" or "50%")—indicative of whether the recipient scanned the identifier, a duration between delivery of the advertising campaign and scanning of the identifier, a quantity of scans recorded for this identifier, etc.

In one implementation, the computer system can selectively update the customized advertising experience served to the user based on previous engagement of the user with the advertisement card, such as represented by a quantity of scans of the identifier entered by the user. For example, at a first time, the computer system can: responsive to a first scan event that captures an identifier, at a computing device accessed by a user, receive a first query (or "request"), specifying the identifier, from the computing device; identify the user based on a recipient code—linked to a recipient profile generated for the user—included in the identifier; derive a first engagement metric for the target recipient interacting with the advertisement card based on the first scan event, such as representing an initial scan of the identifier by the user; store the first engagement metric in the recipient profile; and assemble a first customized advertising experience—corresponding to the identifier and/or this particular user—for presentation to the user within a first instance of an electronic document (e.g., linked to the identifier), based on the first engagement metric and/or a set of recipient characteristics (e.g., mailing address, age range, gender, geographic region, device type, historical engagement data).

Later, at a second time preceding the first time, the computer system can: responsive to a second scan event that captures the identifier, at the computing device accessed by the user, receive a second query specifying the identifier from the computing device; identify the user as the target recipient based on the recipient code included in the identifier; access the first engagement metric—representative of the first scan event—stored in the recipient profile; derive a second engagement metric for the target recipient interacting with the advertisement card based on the first and second scan events (e.g., based on the second scan event and the first engagement metric); and update the first customized advertising experience to generate a second customized advertising experience (e.g., an updated customized advertising experience) for presentation to the target recipient within a second instance of the electronic document, based on the second engagement metric and/or the set of recipient characteristics.

Additionally, in this example, based on the second engagement metric—representative of both the first and second scan event, and therefore indicating a relatively high level of engagement of the user interacting with the first advertisement card—the computer system can: access a second set of contact information associated with a sender of the advertisement card; generate a notification indicating a high level of engagement (e.g., two scans of the QR code) of the first target recipient with the first advertisement card and including a first set of contact information—stored in the recipient profile—associated with the first target recipient; and transmit this notification to the sender for review, based on the second set of contact information. Thus, the computer system can assemble customized advertising experiences for each scan event and generate notifications to the sender to indicate levels of engagement based on the amount of scan events of the identifier.

The computer system can therefore update content presented to the recipient during subsequent scan events for a single identifier—printed on an advertisement card mailed to the recipient—based on previous engagement of this recipient with the advertisement card. In particular, as the user continues to scan the identifier—which may indicate a relatively high level of engagement or interest in content related to the advertisement card—the computer system can selectively serve different and/or updated ad content—such as within the same advertising campaign—to the recipient in order to reinforce the user's engagement with content (e.g., corresponding to a brand, product, event, and/or company) and/or to push the user toward a particular outcome, such as purchasing a product, attending an event (e.g., a sale event, an open house, a car show), joining a group or signing up to receive additional content, visiting a business (e.g., in person and/or online), etc.

5.2 Timing of Scan Events

Additionally and/or alternatively, in one implementation, the system can selectively update content served to the recipient—responsive to scan events for a particular identifier—based on a duration between scan events for this particular identifier.

For example, in this implementation, in response to a first scan event—corresponding to scanning of an identifier printed on an advertisement card—initiated at a first time by a computing device accessed by a target recipient, the system can: generate a first custom advertising experience for presenting to the target recipient based on information—such as a pointer, a recipient code, an advertisement code, etc.—included in the identifier; access a first time value (e.g., a timestamp) corresponding to the first time; and store the first time value—such as in combination with a first engagement metric representing the first scan event—in a recipient profile associated with the target recipient. Then, in response to a second scan event—corresponding to scanning of the identifier printed on the advertisement card—initiated by the computing device at a second time preceding the first time, the system can: access the recipient profile based on information included in the identifier; calculate a duration between the first and second scan event based on the first time value and a second time value corresponding to the second time; and, in response to the duration falling below a threshold duration (e.g., defined for the advertisement card), select a second instance of the first custom advertising experience for presenting to the target recipient. Alternatively, in response to the duration exceeding the threshold duration, the system can generate a second custom advertising experience for presenting to the target recipient.

5.3 Location of Scan Events

Additionally and/or alternatively, in another implementation, the system can selectively update content served to the recipient—responsive to scan event for a particular identifier—based on a location of the recipient during a particular scan event.

In particular, in response to a first scan event—corresponding to scanning of an identifier printed on an advertisement card—initiated at a first time by a computing device accessed by a target recipient, the system can: receive a first query—specifying the identifier—for advertising content; access a first set of query characteristics corresponding to the first query and including a first location identifier—such as derived from an IP address associated with the computing device—linked to a location of the recipient during the first scan event; predict a first location of the recipient based on the first location identifier; select a first custom advertising experience for presenting to the target recipient based on information (e.g., a pointer, a recipient code, an advertisement code) included in the identifier and the first location; and store the first location—linked to the first location identifier—and the first engagement metric in a recipient profile associated with the target recipient. Later, in response to a second scan event—corresponding to scanning of the identifier printed on the advertisement card—initiated at a second time by the computing device, the system can: receive a second query—specifying the identifier—for advertising content; access a second set of query characteristics corresponding to the second query and including a second location identifier linked to a location of the target recipient during the second scan event; predict a second location of the recipient based on the second location identifier; and select a second custom advertising experience for presenting to the target recipient based on information included in the identifier and the second location;

In particular, in one example, during the first scan event, in response to the first location falling within a threshold distance of a location of the recipient's home (e.g., based on the mailing address of the recipient), the computer system can select the first custom advertising experience—such as a default custom advertising experience defined for scan events corresponding to initial scanning of identifiers printed on a set of advertisement cards in an advertising campaign—for presenting to the target recipient. Later, during the second event, in response to the second location falling within a threshold distance of a target location—such as corresponding to a particular event (e.g., an open house, a car show or sale event, a wedding convention, a business convention) and/or a business (e.g., a storefront, a dealership, an agency)—the computer system can select the second custom advertising experience, in replacement of the first custom advertising experience, for serving to the target recipient, such as including high-resolution (e.g., specific), targeted advertising content related to and/or specific to this particular event or business, thereby promoting a particular outcome and/or pushing the target recipient towards this particular outcome. Alternatively, in response to the second location falling within a threshold distance of the location of the recipient's home, the computer system can serve a second instance of the first custom advertising experience—such as including lower-resolution (e.g., generic) advertising content related to the advertising campaign more generally—and/or a modified instance of the first custom advertising experience to the target recipient.

For example, in response to predicting a first location—corresponding to the target recipient's home address—for the target recipient during a first scan event for an identifier, the computer system can select a first custom advertising experience—including a list of upcoming open houses, presented by a realtor, within a geographic region encompassing the first location—for presenting to the target recipient. Later, in response to predicting a second location—corresponding to a location of an open house advertised in the first custom advertising experience—the system can: generate a second custom advertising experience for presenting to the target recipient at the second location, such as including: additional information (e.g., size, list price, number of rooms, a seller's note, historical sale information, time on the market, schools in the area) regarding this particular home (e.g., corresponding to the open house); contact information of the realtor and/or a selectable icon configured to notify the realtor to find and/or speak with the target recipient at the open house; a list of homes for sale within a threshold distance of the open house and/or exhibiting similar characteristics (e.g., sale price, neighborhood, size) of this particular home; and updated list of upcoming open houses—tailored to this particular target recipient—selected based on attendance of the target recipient at the open house for this particular home; etc.

5.4 Multiple Users

Additionally and/or alternatively, in one implementation, the computer system can distinguish between multiple users scanning an identifier—such as during multiple scan events—and selectively assemble a customized advertising experience for presenting responsive to a scan event based on identification of a particular user corresponding to the scan event.

In one example, a first users may scan the identifier (e.g., QR code) at a first time and a second user (e.g., such as a spouse, roommate, neighbor, and/or acquaintance of the first user) may scan the identifier at a second time, the first and second user each associated with a particular computing device (e.g., a first computing device and a second computing device) and a particular location (e.g., a household). In this example, the computer system can: receive a query for each scan event; and selectively link a set of query characteristics—such as location, device identifier, time of day, etc. specified by the query—to a recipient profile associated with a target recipient of an advertisement card including the identifier. Alternatively, the computer system can selectively identify the user as a second target recipient—such as based on a distance between locations of scan events exceeding a predefined distance threshold (e.g., 30 feet, 9 meters)—and remove the query characteristics from the recipient profile.

For example, during a first time period, responsive to a first scan event that captures an identifier (e.g., QR code), at a computing device accessed by a first user, the computer system can receive a first query containing the identifier (e.g., QR code) from the computing device. Then, the computer system can: access a first set of query characteristics contained in the first query including a first location of the computing device for the first scan event (e.g., a latitude and a longitude of the computing device) and a first device identifier (e.g., first IP address) associated with the computing device; and linking the first device identifier to the recipient profile associated with the target recipient. Later, during a second time period succeeding the first time period, the computer system can: receive a second query containing the identifier (e.g., QR code) from a second computing device in response to a second scan event that captures the identifier (e.g., QR code) at a second computing device accessed by a second user; access a second set of query characteristics contained in the third query that includes a second location (e.g., a latitude and longitude) of the second computing device for the second scan event and a second device identifier (e.g., IP address) associated with the second computing device; calculate a distance between the first location of the computing device and the second location of the second computing device. Then, in response to the distance (e.g., 2 meters) falling below a distance threshold (e.g., 9 meters), the computer system can link the second device identifier (e.g., IP address) to the recipient profile associated with the target recipient. Furthermore, the computer system can: maintain the updated customized advertising experience for presentation to the target recipient within the second instance of the electronic document; and trigger the second computing device to navigate to the second instance of the electronic document based on the pointer.

Figure 4:
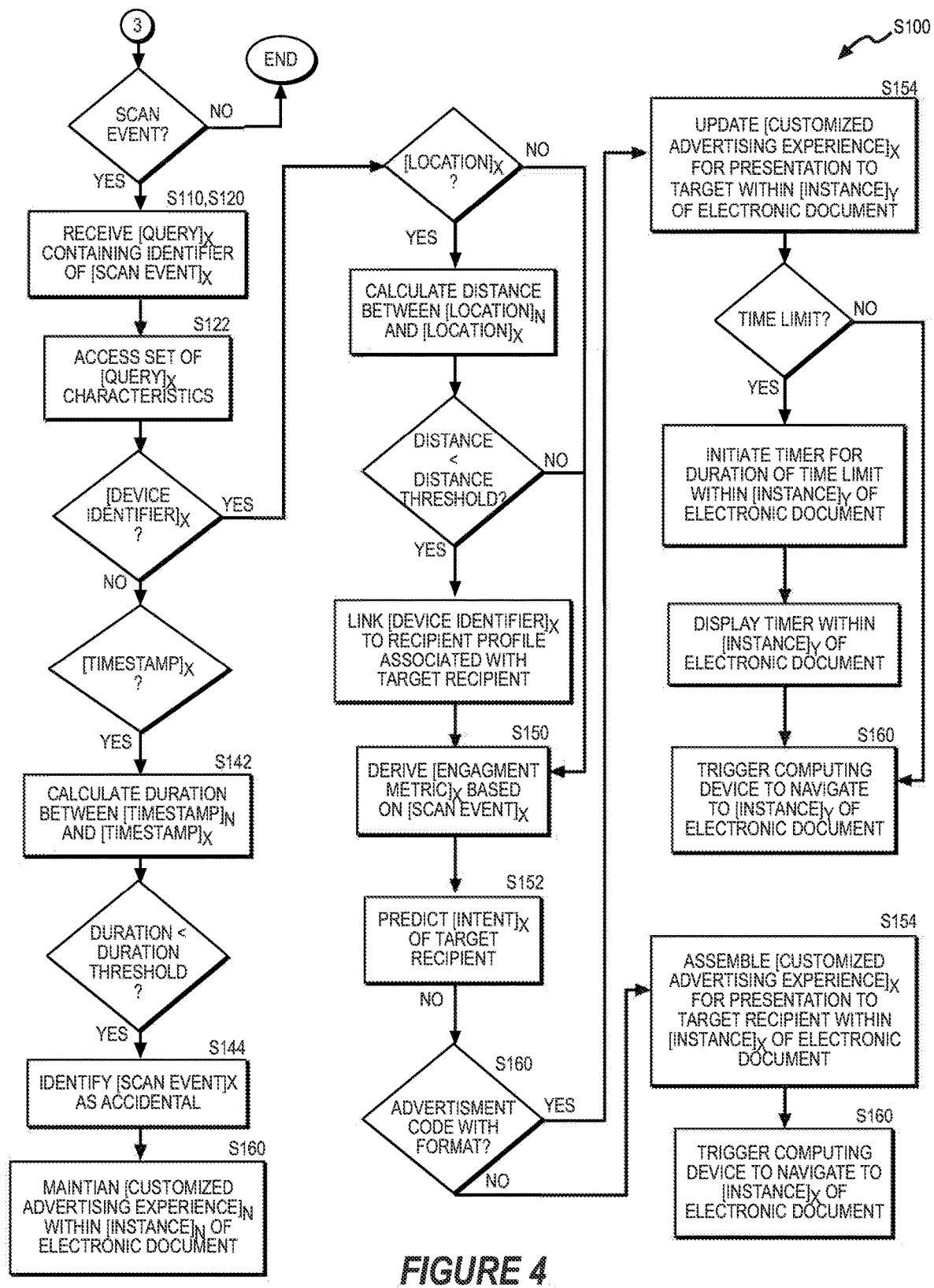
FIG. 4 is a flowchart representation of one variation of the first method.

Later, during a third time period succeeding the second time period, in response to the distance (e.g., 10 meters) exceeding the distance threshold (e.g., 9 meters), the computer system can remove the second device identifier from the recipient profile associated with the target recipient and identify the second user as a second target recipient. The computer system can then implement and repeat these methods and techniques for the second target recipient and for each other scan event, to serve customized advertising experiences to recipients, as shown in FIG. 4.

Therefore, the computer system can leverage query characteristics—such as location of a computing device—and a predefined distance threshold to identify two users within a particular location (e.g., a household) and provide advertising content to both users with a single customized advertising experience.

5.5 Accidental Scan Event

In one variation, the computer system can detect an accidental scan event of the identifier (e.g., QR code) based on a predefined duration threshold (e.g., 30 seconds, one minute, five minutes). In particular, in Blocks S142 and S144 of the method S100, the computer system can calculate a duration between a first timestamp of a first scan event and a second timestamp of a second scan event and responsive to the duration falling below the predefined duration threshold, the computer system can identify the second scan event as accidental (e.g., first scan of QR code is intentional and second scan of QR code is accidental), as shown in FIG. 4.

For example, in response to a second scan event that captures the identifier, at the computing device at a second time, the computer system can: receive a second query containing the identifier from the computing device; access a second set of query characteristics corresponding to the second query, the second set of query characteristics including a second timestamp corresponding to the second time and the device identifier associated with the computing device; and calculate a duration between the first scan event and the second scan event based on the first timestamp and the second timestamp. Responsive to the duration falling below a duration threshold from the first scan event, the computer system can: identify the second scan event as accidental by the target recipient; and maintain the customized experience within the first instance of the electronic document.

Alternatively, responsive to the duration exceeding the predefined duration threshold, the computer system can generate a notification to the sender indicating high level of engagement of the target recipient with the advertisement card (e.g., two intentional scans of the QR code). The computer system can implement the methods and techniques described above to: identify the two scans of the QR code as multiple scan events; access a set of contact information associated with a sender of the advertisement card (e.g., upon request of the sender or stored within a sender code of the QR code); generate a notification indicating a high level of engagement (e.g., two scans of the QR code) of the first target recipient with the first advertisement card and include the set of contact information associated with the target recipient; and transmit the notification to the sender for review, based on the set of contact information associated with the sender.

Therefore, the computer system can distinguish between an accidental scan event of the identifier (e.g., QR code) and multiple scan events of the identifier (e.g., QR code) based on a predefined duration threshold between timestamps of scan events.

6. Tracking User Engagement

In response to receiving a customer query, the computer system can record a set of query characteristics corresponding to the customer query. For example, the computer system can record: an identity of a target recipient associated with the customer query; a code or "identity" of the particular advertisement card associated with the customer query; a binary engagement metric indicating whether the target recipient scanned a QR code included in the advertisement card; a time of day; a geographic location of the target recipient; an IP address; a device ID; etc. The computer system can then store this data (e.g., at a remote database) to track engagement of the target recipient with the advertisement card, such as in a recipient profile associated with the target recipient.

The computer system can therefore identify and track engagement of each individual target recipient that engaged (e.g., by scanning the QR code) with the advertisement card. Furthermore, the computer system can track engagement of each target recipient with the advertisement card regardless of timing (e.g., relative initial delivery of the advertisement card) of this engagement. For example, at a first time, a sender may mail a set of advertisement cards to a set of target recipients. Then, at a second time offset the first time by less than one week, the computer system can: receive a first query from a first computing device accessed by a first target recipient in the set of target recipients; and record a first set of query characteristics corresponding to the first query. Later, at a third time offset the first time by several months, the computer system can: receive a second query from a second computing device accessed by a second target recipient in the set of target recipients; and record a second set of query characteristics corresponding to the second query. The computer system can therefore: log engagement metrics of target recipients interacting with advertisement cards over time; and identify target recipients that may respond more quickly or more slowly to advertisement cards received via mail.

In one variation, the computer system can leverage recorded engagement metrics to identify a first group of target recipients that generally (e.g., frequently) read advertisement cards (e.g., based on queries received from devices associated with these target recipients) and/or a second group of target recipients that generally discard advertisement cards. The computer system can then leverage these groups to enable senders of advertisement cards to selectively send future advertisement cards. For example, the computer system can: generate a whitelist including a first set of target recipients, each target recipient in the first set of target recipients exhibiting a percentage of "read" advertisement cards (e.g., based on a quantity of advertisement cards scanned and a total quantity of advertisement cards delivered to the target recipient) above a threshold percentage; and a blacklist including a second set of target recipients, each target recipient in the second set of target recipients exhibiting a percentage of "read" advertisement cards (e.g., based on a quantity of advertisement cards scanned and a total quantity of advertisement cards delivered to the target recipient) below the threshold percentage.

Further, in another variation, the computer system can also record a set of outcome characteristics (or "outcomes") representative of downstream actions performed by the first customer after receiving the first advertisement card. For example, the computer system can record: whether the target recipient scanned the QR code on the advertisement card; a duration of time of a browse session of the target recipient at an electronic document associated with the advertisement card; whether the target recipient communicated (e.g., on the phone, via email, via chat window with the electronic document) directly with a sender of the advertisement card; whether the target recipient engaged in a business transaction with the sender; a value corresponding to the business transaction; etc. The computer system can then store these outcome characteristics at the recipient profile to track engagement of the target recipient with the advertisement card over a particular period of time, such as expiring at a termination of the browse session, expiring after a threshold duration (e.g., 1 month, 3 months, 1 year) from originally sending the advertisement card, and/or expiring upon termination of an advertising campaign including the advertisement card.

The computer system can therefore attribute downstream actions executed by the target recipient to a particular advertisement card sent to this target recipient. Similarly, in this variation, the computer system can leverage engagement data—representing engagement with advertisement cards (e.g., scanning of identifiers) and/or downstream outcomes executed by recipients of the advertisement cards—to identify a particular group of recipients (e.g., selected from a greater population of recipients) more likely to engage with advertisement cards and/or more likely to perform a particular outcome (or "target outcome") or outcomes (e.g., specified by the advertisement card, the advertisement campaign, and/or a sender of the advertisement card), such that sender of advertisement cards may selectively distribute (e.g., mail) future advertisement cards to this particular group of recipients.

7. Intent

In one implementation, the computer system can predict user intent to engage with advertising content—such as whether the user will scan an identifier printed on an advertisement card, whether the user will complete a purchase, whether the user will view advertising content (e.g., for a threshold duration), whether the user will attend an advertised event or travel to a storefront, etc.—presented to the user within the advertisement card and/or served to the user responsive to scanning of the identifier. In this implementation, the computer system can leverage known and/or user characteristics—such as a home address, a geographic region including the user's home address, gender, age range, historical engagement data of this user, etc.—to predict the user's intent to engage with advertising content.

7.1 Intent Model

The computer system can also implement an intent model configured to predict intent of the user to interact with advertising content (e.g., a physical advertisement card, a digital advertising experience) presented to the user.

In one implementation, the computer system automatically develops (or "learns") a model for a particular advertisement card based on query characteristics—such as time of day, recipient characteristics (e.g., recipient demographics), device characteristics (e.g., mobile or desktop, operating system of device)—and engagement data recorded during a first segment of a new advertising campaign (e.g., for a first set of advertisement cards), such as during a short, initial test run of the new advertising campaign.

For example, the computer system can, over a first period of time: generate a population of QR codes, matched to a population of target recipients, for placement within a population of advertisement cards distributed to the population of target recipients; receive a corpus of customer queries, each customer query in the corpus of customer queries corresponding to a target recipient, in the population of target recipients and including a QR code, in the population of QR codes, matched to the target recipient; access a corpus of query characteristics (e.g., user demographic data, location of device, device type, advertisement card data, time of scanning a QR code) corresponding to the corpus of customer queries; access a corpus of engagement data representing interactions (e.g., scanning the QR code, browsing a linked electronic document, engaging with the sender) of the population of target recipients with the population of advertisement cards; and generate an intent model linking these query characteristics to advertising outcomes (e.g., QR code scanned, secondary website visited, spoke to an agent) based on the corpus of query characteristics and the corpus of engagement data. The computer system can therefore leverage this intent model to predict future interactions between target recipients and advertisement cards, in the set of advertisement cards, based on characteristics of these target recipients.

Additionally or alternatively, the computer system can build an intent model for a particular advertisement card, a particular advertising campaign (e.g., including a variety of advertisement cards), a particular call-to-action (e.g., "Scan here to learn more!", "Speak to an agent today!", or "Scan here to find your new vacation home!"), a particular advertising format (e.g., postcard, letter, proportion of image to text content), and/or types of advertising content (e.g., real-estate, lifestyle, automotive). Furthermore, the computer system can build an intent model for an individual target recipient or for a particular group of target recipients (e.g., within a particular region, within a particular age range). Alternatively, the computer system can build a global intent model configured to predict engagement of all target recipients with advertisement cards.

7.2 Selective Advertisement Card Distribution

In one implementation, the computer system can leverage the intent model to enable senders and/or advertisers to selectively serve current and/or future advertisement cards—such as corresponding to particular advertising campaigns—to target recipients based on historical and/or predicted engagement of target recipients.

For example, the computer system can generate an intent model, as described above, configured to predict engagement of target recipients of advertisement cards (e.g., within an ad campaign). For a particular target recipient, the computer system can leverage the intent model to predict engagement of this new target recipient with a particular advertisement card based on characteristics of the new target recipient and/or characteristics of the advertisement card. In particular, in this example, the intent model can be configured to intake: an address of a target recipient; an age of the target recipient; a gender of the target recipient; a format of the advertisement card; a call-to-action included in the advertisement card; and a content type of the advertisement card. Based on these characteristics and the intent model, the computer system can predict an engagement score for the target recipient interacting with the advertisement card. The computer system can then repeat this process to predict engagement scores for a population of target recipients and therefore enable a sender of the advertisement card and/or an advertiser associated with the advertisement card to identify a subset of target recipients, within the population of target recipients, most likely to engage with the advertisement card.

Additionally and/or alternatively, in the preceding example, the computer system can leverage historical engagement data (e.g., stored in the recipient profile) of the target recipient to "mask" and/or modify the intent model to better predict engagement of this particular target recipient with the advertisement card.

Therefore, in this implementation, the computer system can leverage this intent model—in combination with (known) characteristics (e.g., address, gender, geographic region, device type) of users in the population of users, known advertisement characteristics (e.g., ad metadata, ad format, content type), and/or historical engagement data of a set of users—to identify a particular subset of users, in the set of users, most likely to engage with advertisement cards (e.g., sent via mail) and/or a particular advertisement card.

7.3 Customized Advertising Experiences

Additionally and/or alternatively, in one implementation, the computer system can predict user intent to engage with advertising content—such as whether the user will complete a purchase, whether the user will view advertising content (e.g., for a threshold duration), whether the user will attend an advertised event or travel to a storefront, etc.—presented to the user responsive to a scan event. The computer system can then leverage this predicted intent to selectively generate unique (or "custom") advertising experiences—tailored to this user—for presenting to the user in (near) real time. For example, the computer system can assemble a custom advertising experience—including a particular subset of advertising content, selected from a greater assortment of advertising content, matched to the user's predicted intent—predicted to yield high engagement of the user interacting with the particular subset of advertising content.

For example, in response to a scan event initiated at a computing device (e.g., accessed by a user) and that captures an identifier (e.g., a QR code), printed on an advertisement card, the computer system can: predict a current intent of the user to engage with advertising content—such as advertising content related to the advertisement card—based on the intent model, historical engagement data (e.g., engagement metrics) for this user (e.g., stored in the recipient profile), a set of recipient characteristics (e.g., stored in the recipient profile) corresponding to the user, and/or a set of query characteristics—such as a time of day, a device type of the computing device, a geographic location of the computing device, etc.—corresponding to the query; assemble a customized advertising experience—including advertising content related to the advertisement card—that is matched to the predicted current intent of the user; and trigger the computing device to navigate to a webpage loaded with this customized advertising experience.

In the preceding implementation, the computer system can leverage engagement data collected for a user—such as current and/or historical engagement data—to predict user intent to engage or interact with advertising content presented to the user, such as whether the user will interact with an advertisement according to a particular outcome and/or whether the user will perform a downstream action (or "outcome") responsive to viewing the advertisement, such as complete a purchase, attend an event, visit a business (e.g., in-person and/or online), request additional information, schedule an appointment, etc.

In particular, in one example of this implementation, in response to a first scan event of an identifier, printed on an advertisement card, and initiated at a computing device, the system can: receive a query for advertising content from the computing device; derive a first engagement metric for a user interacting with the advertisement card based on the first scan event; predict a first intent of the user to engage with advertising content related to the advertisement card based on the first engagement metric and the intent model; and—based on the first intent—select a first customized advertising experience for presenting to the user at the computing device. The computer system can then store this first engagement metric in a recipient profile generated for this particular user. Later, in response to a second scan event—such as for the same identifier and/or for a second identifier printed on a second advertisement card—initiated at the computing device, the computer system can: access the first engagement metric—representative of the first scan event—stored in the recipient profile; derive a second engagement metric for the user interacting with this advertisement card based on the second scan event; predict a second intent of the user to engage with advertising content related to this advertisement card based on the first and second engagement metrics and the intent model; and—based on the second intent—select a second customized advertising experience for presenting to the user at the computing device. The computer system can thus continue to collect engagement data for this user over time, and selectively assemble (e.g., select, generate) customized advertising experiences for presenting to the user—responsive to scan events—based on this historical engagement data and the intent model.

Furthermore, the computer system can: identify a set of users that historically engage with physical mail; target this set of users; and link types of engagement data (e.g., engagement metrics) exhibited by this set of users with types of advertising content (e.g., real-estate content, car-sales content, retail content) served to these users. The computer system can calculate: a first engagement metric based on a first scan event of an identifier (e.g., the user scans a QR code at a computing device at a first time); a second engagement metric based on a second scan event of the identifier (e.g., the user scans the QR code at the computing device at a second time to sign up for a realtor mailing list); and a third engagement metric based on a third scan event of the identifier (e.g., the user scans the QR code at the computing device at a third time at an open house). Accordingly, the computer system can identify the first engagement metric as a moderate level of engagement, the second engagement metric as a high level of engagement, and the third engagement metric as a very high level of engagement between the user and the advertising content (e.g., realty content). The computer system can leverage these engagement metrics to continue to target this user in the future and/or to identify future users, exhibiting similar engagement data, to selectively serve advertising content to these future users.

Additionally and/or alternatively, in the preceding implementation, the computer system can leverage known recipient characteristics—such as a mailing address, geographic region, age, gender, device characteristics (e.g., device type, device operating system), etc.—to predict user intent. In particular, in this implementation, the computer system can: access recipient characteristics—such as including contact information for the user and/or user demographic data—specified by a user profile associated with the user; and predict an intent of the user to engage with advertising content related to the advertisement card based on these recipient characteristics.

Additionally and/or alternatively, in the preceding implementation, the computer system can predict an intent of the user to engage with advertising content related to the advertisement card based on engagement data and recipient characteristics. In particular, in this implementation, the computer system can derive a first engagement metric for a target recipient interacting with an advertisement card, based on a scan event. Then, the computer system can implement the methods and techniques described above to predict an intent of the target recipient to engage with advertising content based on the engagement metric (i.e., historical engagement of this target recipient with advertising content) and/or recipient characteristics (e.g., address, location, age, gender, user demographic data, etc.) associated with the user.

Additionally and/or alternatively, in the preceding implementation, the computer system can access query characteristics corresponding to a query associated with a scan event and predict intent of the user based on these query characteristics. For example, the computer system can: receive a query in response to a first scan event at a first time; access a set of query characteristics corresponding to the query, the set of query characteristics including a timestamp (e.g., time of day of the first scan event) corresponding to the first time and a device identifier (e.g., IP address) associated with the computing device accessed by a target recipient for the first scan event. Then, the computer system can predict the intent of the user based on the intent model, set of query characteristics, an engagement metric, and/or the set of recipient characteristics.

Therefore, the computer system can leverage the predicted intent of the target recipient to assemble a customized advertising experience including content related to the advertising campaign and tailored to the target recipient.

7.3.1 Model Generation: Customized Advertising Experiences

In one implementation, the computer system can derive an intent model based on user characteristics (e.g., user demographic data, location of device, device type, advertisement card data, time of scanning a QR code) and engagement data (e.g., scanning the QR code, browsing a linked electronic document, engaging with the sender). More specifically, the computer system can derive an intent model linking these user characteristics and intent to engage with advertising content. Additionally or alternatively, the computer system can access a corpus of query characteristics corresponding to queries received from a population of computing devices, accessed by a population of users, and derive the intent model based on the engagement data, the user characteristics, and the corpus of query characteristics.

For example, during an initial time period preceding a first scan event, the computer system can: serve a set of advertising experiences comprising advertising content to a population of computing devices accessed by a population of users; receive a corpus of engagement data representing interactions of users in the population of users with the set of advertising experiences; access a corpus of user characteristics corresponding to the population of users; and based on the corpus of engagement data and the set of user characteristics, derive an intent model linking user characteristics and intent to engage with advertising content.

In the preceding example, the computer system can then implement Blocks of the method S100 to access a set of recipient characteristics and derive an engagement metric in response to a first scan event. Then, the computer system can predict a first intent of a target recipient to engage with advertising content related to an advertisement card based on the intent model, the first engagement metric, and the set of recipient characteristics. Additionally and/or alternatively, the computer system can: access a corpus of query characteristics corresponding to queries received from the population of computing devices; serve the set of advertising experiences to the population of computing devices; and derive the intent model based on the corpus of engagement data, the corpus of user characteristics, and the corpus of query characteristics.

Additionally, in response to receiving a query associated with a first scan event, the computer system can: access a set of query characteristics corresponding to the query, the set of query characteristics including a first location of the computing device and a device identifier (e.g., IP address) associated with the computing device in Block S122. Then the computer system can predict a first intent of the target recipient to engage with advertising content related to the advertisement card based on the intent model, the first engagement metric, the set of recipient characteristics, and the set of query characteristics.

Figure 2:
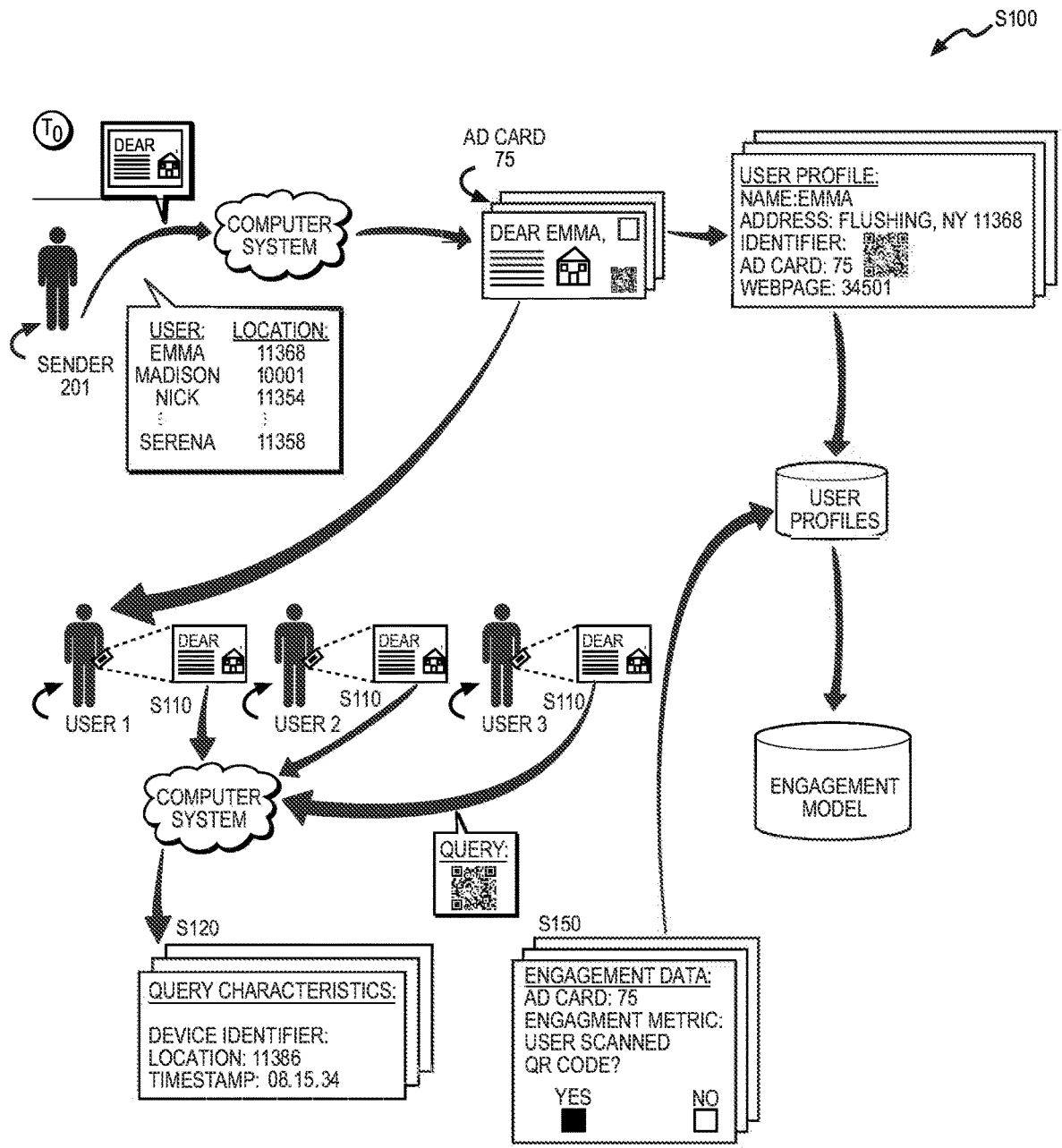
FIG. 2 is a flowchart representation of one variation of the first method.
Figure 3:
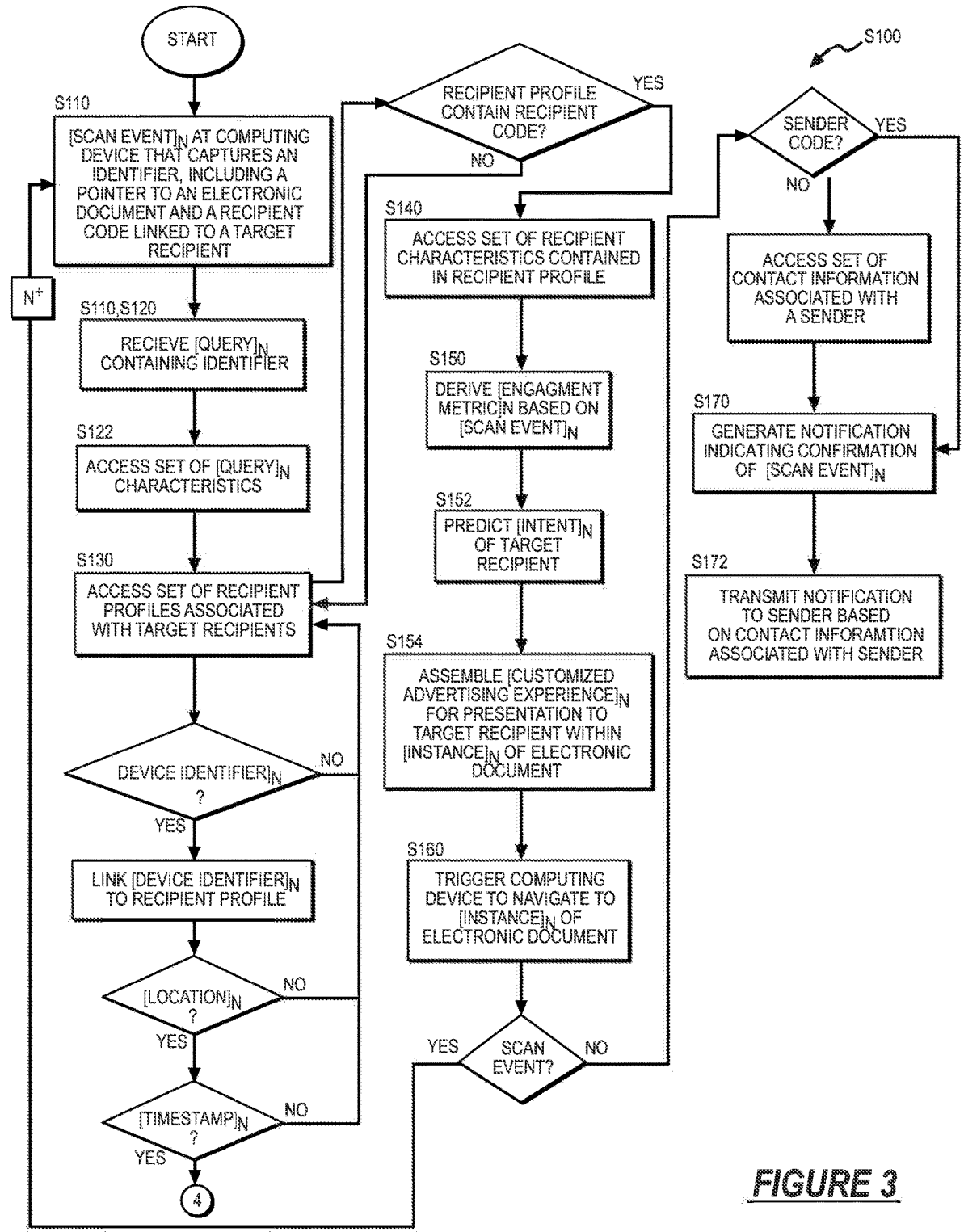
FIG. 3 is a flowchart representation of one variation of the first method.

The computer system can then assemble a customized advertising experience for presentation to the target recipient and trigger the computing device to navigate to the customized advertising experience based on a pointer contained in the identifier. Responsive to serving a customized advertising experience to the target recipient, the computer system can: access a set of engagement data representing interactions of the target recipient with the customized advertising experience; derive a second engagement metric based on the set of engagement data; store the first engagement metric and the second engagement metric in a set of engagement metrics corresponding to the first scan event; and store the set of engagement metrics in the first recipient profile, in the set of recipient profiles, as shown in FIG. 2.

Therefore, the computer system can generate an intent model for a particular target recipient and track engagement of the particular target recipient linked to engagement data (e.g., scanning the QR code, browsing a linked electronic document, engaging with the sender) associated with the particular target recipient.

7.4 Intent: Multiple Scan Events

In one variation, the computer system can implement the methods and techniques described above to leverage the intent model for multiple scan events to assemble a customized advertising experience for a first scan event and update the customized advertising experience for a second scan event, such as based on recipient characteristics (e.g., stored in the user profile), historical engagement data (e.g., engagement metrics for this user), query characteristics (e.g., corresponding to a query for the scan event), a duration between subsequent scan events, a location of the user during a scan event, and/or identification of a particular user corresponding to the scan event.

For example, responsive to a first scan event, the computer system can assemble a customized advertising experience for presentation to a target recipient within a first instance of an electronic document (e.g., webpage for an open house), based on the intent model, a set of recipient characteristics associated with the target recipient, and a first engagement metric for the target recipient interacting with an advertisement card. Then responsive to a second scan event, the computer system can assemble an updated customized advertising experience for presentation to the target recipient within a second instance of the electronic document (e.g., webpage for the open house and other nearby open houses based on query characteristics contained in the second query), based on the intent model, the set of recipient characteristics and the second engagement metric.

8. Generation of Ad Mailers

As shown in FIG. 5, one variation of the method S100 includes: during a setup period, generating an identifier in a set of identifiers, for placement on an advertisement card in a set of advertisement cards associated with an advertising campaign in Block S180, the identifier including a pointer to an electronic document associated with the advertising campaign and a recipient code linked to a target recipient of the advertisement card. At a first time succeeding the setup period, receiving a first query from a robotic system for a card print file (e.g., a vector image) to pair with a first template card, in a set of template cards, generated for a print order and loaded at the robotic system, each template card, in the set of template cards, including a card identifier, in a set of card identifiers, printed on the template card in Block S182; identifying a first card identifier (e.g., a barcode), in the set of card identifiers, printed on the first template card in Block S184; accessing a first envelope identifier, in a set of envelope identifiers, linked to the first card identifier, each envelope identifier, in the set of envelope identifiers, linked to a particular card identifier, in the set of card identifiers in Block S186; selecting a first recipient, from a list of recipients defined for the print order, for assigning to the first card identifier in Block S188; linking the first card identifier and the first envelope identifier to a first mailer profile, in a set of mailer profiles, associated with the first recipient in Block S190; retrieving a first card print file, in a set of card print files generated for the print order, stored in the first mailer profile, each card print file, in the set of card print files, corresponding to a particular recipient in the list of recipients; and loading the first card print file onto the robotic system for pairing with the first template card to print a first advertisement card, in a set of advertisement cards, for the first recipient according to the first card print file in Block S192.

At a second time succeeding the first time, the method S100 further includes: receiving a second query for an envelope identifier, in the set of envelope identifiers, for printing on a first template envelope, in a set of template envelopes, paired with the first advertisement card in Block S182; and, in response to identifying the first card identifier printed on the first advertisement card, retrieving the first envelope identifier linked to the first card identifier and triggering printing of the first envelope identifier on the first template envelope in Block S194.

At a third time succeeding the first time, the method S100 further includes: receiving a third query from the robotic system for an envelope print file for pairing with the first template envelope in Block S182; in response to identifying the first envelope identifier printed on the first template envelope, retrieving a first envelope print file, in the set of envelope print files, stored in the first mailer profile in Block S196; and loading the first envelope print file onto the robotic system for pairing with the first template envelope for printing of a first addressed envelope according to the first envelope print file, to generate a first ad mailer—corresponding to the first recipient and including the first addressed envelope loaded with the first advertisement card—in a set of ad mailers generated for the print order in Block S198.

8.1 Link: Advertisement Card+Envelope+Recipient

Generally, Blocks of the method S100 can be executed by the computer system in cooperation with a robotic system (e.g., a set of printers and/or optical readers) to generate a set of ad mailers—including a set of advertisement cards and a set of envelopes configured to receive and retain the set of advertisement cards—for a print order received from a particular sender, each ad mailer, in the set of ad mailers, linked to a particular recipient in a set of recipients specified by the print order.

In particular, the computer system can selectively distribute print files (e.g., vector images) containing instructions for printing content on an advertisement card and/or envelope in order to coordinate assembly of a set of ad mailers—each ad mailer customized for a particular recipient—for a particular print order. In one implementation, the computer system can interface with a robotic system including: a robotic printer (e.g., a single point printer) configured to receive print files from the computer system and manipulate a writing implement (e.g., a pen) on a writing surface (e.g., an advertisement card, an envelope) to generate "handwritten" documents according to the print files; and a laser printer configured to receive print files from the computer system and laser print copies of the received print files accordingly.

In this implementation, the robotic system can also include a set of optical readers configured to scan card and/or envelope identifiers (e.g., 2D-matrix barcodes) printed on the set of advertisement cards and/or the set of envelopes. The computer system can then access these identifiers scanned by the set of optical readers to retrieve and/or assign print files—each print file linked to a particular recipient in the set of recipients specified by the print order—for returning to the set of printers for printing on the set of advertisement cards and/or the set of envelopes.

The computer system in combination with the robotic system (hereinafter "the system") can therefore assemble an ad mailer for a particular recipient that includes an advertisement card tailored to this particular recipient—such as including a recipient-specific heading (e.g., "Hi John" or "Dear Amy")—inserted in an envelope addressed to this particular recipient.

8.2 Print Order

In one implementation, the system can initially receive a print order for a set of ad mailers—including a set of advertisement cards and a set of envelopes configured to receive and retain the set of advertisement cards—specifying a particular set of order parameters. In particular, the system can receive a print order for a set of ad mailers specifying: a list of recipients designated to receive the set of advertisement cards; and contact information (e.g., name, mailing address, email address, phone number) for each recipient on the list of recipients. Additionally, in this implementation, the system can receive advertising content (e.g., images, a call to action) specified by the print order.

For example, in response to receiving a print order from a sender for a set of advertisement cards, the system can access a set of order parameters defined for the print order (e.g., by the sender), such as: advertising content—such as a static advertisement (e.g., images related to a product, an event, and/or the sender sending the advertisement cards), a logo, informational text, and/or a particular call to action (e.g., "Call today to learn more!")—for printing (e.g., laser printing) on each advertisement card in the set of advertisement cards; a block of text for "handwritten" printing by a robotic system (e.g., a single point printer) configured to replicate the block of text in a typeface that mimics that sender's handwriting; contact information (e.g., name, address, phone number, email address) for a set of recipients designated (e.g., by the sender) to receive the set of advertisement cards in the print order; and/or a quantity of recipients on the list of recipients.

8.2.1 Mailer Profile: Card Vector+Envelope Vector

In one implementation, in response to receiving the print order, the system can generate a mailer profile for each recipient, in the list of recipients, to generate a set of mailer profiles corresponding to the print order. The system can then store recipient-specific printing information in these mailer profiles to enable printing of unique "handwritten" text blocks on the set of advertisement cards.

In particular, in this implementation, in response to receiving a print order for a set of advertisement cards, the system can access a list of recipients—including contact information for each recipient on the list—designated to receive the set of advertisement cards. Then, for each recipient, in the list of recipients, the system can: generate a card print file (e.g., an image vector)—corresponding to recipient-specific content designated for printing on an advertisement card for this recipient—based on contact information (e.g., a name) for this recipient and generic card content specified for this print order; generate an envelope print file (e.g., an image vector)—corresponding to recipient-specific content designated for printing on an envelope for this recipient—based on contact information (e.g., a name and mailing address) for this recipient; generate a mailer profile, in a set of mailer profiles, corresponding to the recipient; append the mailer profile with contact information for the recipient; and append the mailer profile with the card vector and the envelope vector.

Therefore, the system can link a set of print files (e.g., including the card print file and the envelope print file)—containing instructions for printing the recipient-specific advertisement card and corresponding envelope (e.g., configured to receive and retain the advertisement card)—to this particular recipient and to this particular print order.

8.2.2 Complementary Card & Envelope Identifiers

In one implementation, in response to receiving the print order for the set of advertisement cards, the system can generate a set of identifier pairs (e.g., unique identifier pairs)—each identifier pair, in the set of identifier pairs, including a card identifier and an envelope identifier—configured to enable tracking and/or identification of any mailer—including an advertisement card, in the set of advertisement cards, loaded in an envelope, in a set of envelopes, corresponding to the advertisement card—in a set of ad mailers generated for the print order.

In particular, in response to receiving the print order, the system can: generate a set of card identifiers (e.g., a first set of barcodes)—linked to this particular print order—for printing on the set of advertisement cards for this print order; and generate a set of envelope identifiers (e.g., a second set of barcodes)—linked to this particular print order and to the set of card identifiers—for printing on a set of envelopes configured to receive the set of advertisement cards, each envelope identifier, in the set of envelope identifiers, linked to a particular card identifier, in the set of card identifiers.

For example, the system can: generate a first card barcode—including a first character code (e.g., "XYZ59") encoded in the first card barcode—in a set of card barcodes corresponding to a particular print order; generate a first envelope barcode—including the first character code (e.g., "XYZ59") encoded in the first envelope barcode—in a set of envelope barcodes linked to the first card barcode and corresponding to the particular print order; and store this first barcode pair—including the first card barcode and the first envelope barcode—in an order profile generated for the print order; and trigger printing of the first card barcode on a first blank card to generate a first template card, in a set of template cards, for the print order. The system can then repeat this process to generate and store a set of barcode pairs for the print order, each barcode pair, in the set of barcode pairs, configured to be printed on a particular mailer—including an advertisement card inserted and retained in an envelope—in a set of ad mailers generated for the print order.

Therefore, for each card identifier, in the set of card identifiers linked to the print order, the system can: generate a complementary envelope identifier matched to the card identifier, such as by including an identical character code (e.g., a 5-digit character code) in the card identifier and the complementary envelope identifier; and link this complementary envelope identifier to the card identifier and the print order (e.g., in an order profile generated for the print order) for later printing on an envelope containing a particular advertisement card including the corresponding card identifier.

Therefore, by linking these complementary identifiers, the system can enable matching of contents printed on the envelope (e.g., name and/or address of a recipient) to contents of the particular advertisement card—tailored to a particular recipient—loaded within the envelope.

In particular, in response to receiving identification of a particular card identifier on an advertisement card loaded within an envelope, the system can: access the complementary envelope identifier linked to this particular card identifier; and trigger printing of this envelope identifier on the envelope.

8.3 Template Card Generation

In one implementation, in response to receiving the print order for the set of advertisement cards, the system can trigger generation of a set of template cards (e.g., blank cards allocated for printing the set of advertisement cards in this print order)—configured to form the set of advertisement cards—for the print order. In particular, the system can: access a quantity of recipients specified by the print order; and trigger printing (e.g., laser printing) of a set of template cards—including a quantity of template cards equivalent the quantity of recipients—such that each template card, in the set of template cards, includes generic content (e.g., generic ad content) specified for printing on each advertisement card in the set of advertisement cards. The system can therefore preload advertisement cards with generic content—universal to each card in the set of advertisement cards in the print order—prior to appending these cards with recipient-specific information and/or content.

In this implementation, the system can trigger printing of a particular card identifier, in a set of card identifiers linked to the print order, on each template card, in the set of template cards. In particular, in response to receiving the print order for a set of ad mailers—each mailer, in the set of ad mailers, including an advertisement card and an envelope—the system can: generate a set of unique identifier pairs (as described above) including a set of card identifiers and a set of envelope identifiers, each envelope identifier, in the set of envelope identifiers, linked to a particular card identifier in the set of card identifiers; for each template card, in the set of template cards, select a card identifier, in the set of card identifiers, for printing on the template card; and trigger printing of the set of template cards.

For example, the system can: generate a set of unique barcode pairs—including a set of card barcodes and a set of envelope barcodes linked to the set of card barcodes—for a particular print order; and store this set of unique barcode pairs in an order profile (e.g., within a database) generated for the print order, such that the set of unique barcodes are linked to this particular print order. The system can then: receive a first blank card; select a first card barcode (e.g., a 2D matrix)—including a first character code (e.g., "ABC11") encrypted in the first card barcode—from the set of card barcodes; and trigger printing (e.g., laser printing) of the first barcode on the first blank card to generate a first template card, in a set of template cards, for the print order. Then, the system can: receive a second blank card; select a second card barcode—including a second character code (e.g., "ABC12") encrypted in the second barcode—from the set of card barcodes; and trigger printing (e.g., laser printing) of the second card barcode on the second blank card to generate a second template card in the set of template cards. The system can then repeat this process to generate a complete set of template cards—each template card including a particular card barcode selected from the set of card barcodes—linked to the print order.

8.3.1 Advertisement Card: Recipient-Specific Print File

In one implementation, the system can select a recipient to assign to a particular identifier pair in response to receiving a query for a card print file (e.g., from the robotic system) for matching with a template card containing a particular card identifier corresponding to the particular identifier pair.

In particular, in response to receiving a query for a card print file (e.g., an image vector) for printing on a template card, in a set of template cards, loaded in the robotic system and including a particular card identifier, in a set of card identifiers generated for the print order, the system can: select a recipient (e.g., a previously unassigned recipient) from the list of recipients; and assign the recipient to the card identifier printed on the template card. Then, the system can: access a mailer profile, in a set of mailer profiles, corresponding to the recipient; access a card print file (e.g., an image vector)—containing instructions for printing advertisement card content for this particular recipient—stored in the mailer profile; and trigger printing of the card print file on the template card (e.g., by a robotic system) to generate an advertisement card, in a set of advertisement cards, for this particular recipient specified by the print order.

For example, the robotic system can be configured to: receive a first template card from a set of template cards generated for the print order; scan a first card barcode—containing a first character code—printed on the first template card; generate a query for a card print file including the first card barcode and/or the first character code; and transmit the query to a computer system (e.g., a local server, a remote computer system). The computer system can then: access the list of recipients specified by the print order; select a first recipient, from the list of recipients, currently unassigned to a card barcode; access a first mailer profile, in a set of mailer profiles generated for the print order, corresponding to the first recipient; store the first card barcode and/or the first character code in the first mailer profile to link the first recipient to this first card barcode; transmit a first card print file—including instructions for printing content specific to the first recipient on the first template card—to the robotic system; and trigger the robotic system to print content on the first template card according to the first card print file to generate a first advertisement card, in a set of advertisement cards, for the print order. The system (e.g., the computer system and/or the robotic system) can then repeat this process to generate an advertisement card for each recipient, in the list of recipients specified by the print order.

Therefore, by delaying assigning of a recipient to a particular card identifier—and therefore to a particular advertisement card—until receiving a query for a corresponding card print file (e.g., when the particular advertisement card is next in line for printing), the system can enable printing of advertisement cards in any order, without necessitating presorting and/or sequencing of template cards queued for printing by the robotic system. The system can therefore eliminate error—such as pairing a card print file generated for a first recipient with a template card including a card identifier previously assigned to a second recipient (e.g., distinct from the first recipient)—due to improper ordering of cards and/or printer error (e.g., skipping a card, running multiple cards through the printer).

8.4 Template Envelope Generation

In one implementation, in response to confirming printing of a particular advertisement card, in the set of advertisement cards, the system can trigger generation of a template envelope—configured to receive and contain the particular advertisement card—matched to this particular advertisement card.

In particular, in this implementation, upon completion of printing of an advertisement card (e.g., by the robotic system)—according to a card print file generated for a particular recipient—the system can: scan the advertisement card to read a card identifier printed on the advertisement card; access a mailer profile, in a set of mailer profiles, corresponding to the card identifier; retrieve an envelope identifier—linked to the card identifier—stored in the mailer profile; and trigger printing of the envelope identifier on the envelope to generate a template envelope thereby linked to the advertisement card and to the particular recipient designated for receiving the advertisement card.

For example, the system can: receive confirmation of a blank envelope loaded in a printer (e.g., a laser printer); receive identification of a first advertisement card including printed content tailored to a first recipient, in a list of recipients specified by the print order, and including a first card identifier, in a set of card identifiers, linked to the first recipient; access a first mailer profile, in a set of mailer profiles generated for the print order, containing the first card identifier; retrieve a first envelope barcode—linked to the first card identifier—contained in the first mailer profile; and trigger printing of the first envelope identifier on the blank envelope—such as in a particular location of the blank envelope configured to receive a postage stamp—to generate a first template envelope. The system can then trigger loading (e.g., folding, inserting, and/or sealing) of the first advertisement card into the first template envelope.

Therefore, by printing the envelope identifier on the template envelope upon identification of a particular advertisement card—including the complementary card identifier—loaded (or designated for loading) in the template envelope, the system can enable loading of advertisement cards into any available envelope, without necessitating searching for a particular envelope matched to an advertisement card and/or presorting of envelopes and advertisement cards. Rather, the system can assign an envelope identifier—and therefore a particular recipient assigned to this identifier—to a particular envelope in (near) real-time based on the card identifier—linked to the particular recipient—printed on an advertisement card loaded in the envelope.

8.5 Envelope: Recipient-Specific Print File

In one implementation, the system can retrieve a particular envelope print file—matched to a particular envelope identifier—in response to receiving a query for an envelope print file (e.g., from the robotic system) for printing on a template envelope containing the particular envelope identifier.

In particular, in response to receiving a query for an envelope print file (e.g., an image vector) for printing on a template envelope—containing an advertisement card tailored to a particular recipient—loaded in the robotic system and including a particular envelope identifier, in the set of envelope identifiers, the system can: access a mailer profile, in a set of mailer profiles, associated with the particular envelope identifier printed on the template envelope; retrieve an envelope print file stored in the mailer profile and associated with the particular recipient; load the envelope print file onto the robotic system; and trigger printing of content on the envelope according to the envelope print file by the robotic print to generate a fully-assembled mailer including an envelope addressed to the particular recipient and an advertisement card—inserted and retained within the envelope—including content (e.g., a note, a letter) tailored to the particular recipient.

For example, the robotic system can be configured to: receive a first template envelope loaded with a first advertisement card tailored to a first recipient; scan a first envelope barcode—containing a first character code—printed on the first template envelope; generate a query for an envelope print file including the first envelope barcode and/or the first character code; and transmit the query to a computer system (e.g., a local server, a remote computer system). The computer system can then: access a first mailer profile, in a set of mailer profiles, associated with the first envelope barcode; retrieve a first envelope print file—including instructions for printing a name and an address of the first recipient on an envelope—stored in the first mailer profile for the first recipient; load the first envelope print file onto the robotic system; and trigger printing of the name and the address of the first recipient on the template card according to the first envelope print file to generate a first ad mailer. The system can then repeat this process to generate a custom ad mailer for each recipient in the list of recipients specified by the print order.

8.6 Unique QR Code

In one variation, for each identifier pair, in the set of identifier pairs, the system can also generate a unique QR code—including a pointer to an electronic document (e.g., a webpage)—linked to the identifier pair. For example, the system can generate: a first identifier pair, in a set of identifier pairs, including a card identifier and an envelope identifier, including a particular character code (e.g., "12345"); and a first QR code, in a set of QR codes, including a pointer to a webpage and including the particular character code (e.g., "12345").

In this variation, the system can trigger printing of a particular QR code—linked to a particular identifier pair—on each template card, in the set of template cards, such that the QR code printed on the template card corresponds to (e.g., includes the same character code as) the particular card identifier printed on the template card. Later, in response to receiving a query for a card print file (e.g., an image vector) for printing on this template card and assigning a particular recipient to the card identifier, the system can similarly assign this QR code to this particular recipient. Therefore, the system can retroactively link this printed QR code with this particular recipient, such that when this recipient receives the corresponding ad mailer, she may scan the QR code (e.g., with her mobile device) to access a customized instance of the electronic document (e.g., a webpage) linked to the QR code (as described above).

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for tracking recipient interactions with advertising mail comprising:
    during a setup period:
        generating a set of advertisement cards for mailing to a set of target recipients, each advertisement card, in the set of advertisement cards, comprising printed advertising content associated with a sender of the set of advertisement cards and an identifier, in a set of identifiers, printed on the advertisement card and comprising:
            a recipient code, in a set of recipient codes, printed on the advertisement card; and a pointer to an electronic document associated with the set of advertisement cards; and for each recipient code, in the set of recipient codes, linking the recipient code to a recipient profile, in a set of recipient profiles, affiliated with a target recipient, in the set of target recipients, to associate a corresponding identifier, in the set of identifiers, with the target recipient; and at a computer system, in response to a first scan event, initiated at a first computing device, remote from the computer system, that captures a first identifier, in the set of identifiers, printed on a first advertisement card in the set of advertisement cards:

receiving a query for advertising content from the first computing device and specifying the first identifier comprising the pointer and a first recipient code in the set of recipient codes;

in response to the first recipient code corresponding to a first recipient profile, in the set of recipient profiles, affiliated with a first target recipient in the set of target recipients:

accessing a set of recipient characteristics specified by the first recipient profile, the set of recipient characteristics comprising a first set of contact information corresponding to the first target recipient;

predicting a first intent of the first target recipient to engage with digital advertising content related to printed advertising content on the first advertisement card based on the first scan event;

based on the first intent and the set of recipient characteristics, generating a set of customized digital advertising content for presenting to the first target recipient within a first instance of the electronic document, the set of customized digital advertising content comprising content related to the first advertisement card and unique to the first target recipient; and triggering the first computing device to navigate to the first instance of the electronic document for presentation of the set of customized digital advertising content to the first target recipient via the pointer; and generating a notification indicating confirmation of the first scan event initiated by the first target recipient and comprising the first set of contact information associated with the first target recipient; and transmitting the notification to a second computing device, remote from the computer system, affiliated with the sender.

2. The method of claim 1:

wherein transmitting the notification to the second computing device affiliated with the sender comprises:

based on the identifier, accessing a second set of contact information associated with the sender of the first advertisement card; and transmitting the notification to the second computing device affiliated with the sender based on the second set of contact information.

3. The method of claim 1:

further comprising, during an initial time period preceding the first scan event:

serving a set of advertising experiences comprising digital advertising content to a population of computing devices, remote from the computer system, accessed by a population of users;

receiving a corpus of engagement data representing interactions of users in the population of users with the set of advertising experiences;

accessing a corpus of user characteristics corresponding to the population of users; and based on the corpus of engagement data and the set of user characteristics, deriving an intent model linking user characteristics and intent to engage with advertising content; and wherein predicting the first intent of the target recipient based on the first scan event comprises predicting the first intent of the target recipient based on the intent model and the first scan event.

4. The method of claim 3:

wherein serving the set of customized advertising experiences to the population of computing devices comprises, in response to receiving queries for advertising content from the population of computing devices:

accessing a corpus of query characteristics corresponding to queries received from the population of computing devices; and serving the set of advertising experiences to the population of computing devices;

wherein deriving the intent model based on the corpus of engagement data and the corpus of user characteristics comprises deriving the intent model based on the corpus of engagement data, the corpus of user characteristics, and the corpus of query characteristics;

further comprising, in response to receiving the query, accessing a set of query characteristics corresponding to the query and comprising:

a first location of the computing device; and a device identifier associated with the computing device; and wherein predicting the first intent of the target recipient based on the intent model and the first scan event comprises predicting the first intent of the target recipient based on the intent model, the first scan event, and the set of query characteristics.

5. The method of claim 1;

further comprising deriving a first engagement metric based on the first scan event, the first engagement metric representing engagement of the first target recipient with printed content presented in the first advertisement card;

wherein predicting the first intent of the first target recipient based on the first scan event comprises predicting the first intent of the first target recipient based on the first engagement metric; and further comprising, in response to triggering the first computing device to navigate to the first instance of the engagement data:

accessing a set of engagement data representing interactions of the first target recipient with the set of customized digital advertising content presented within the first instance of the engagement data;

deriving a second engagement metric based on the set of engagement data, the second engagement metric representing engagement of the first target recipient with the set of customized digital advertising content;

storing the first engagement metric and the second engagement metric in a set of engagement metrics corresponding to the first scan event; and storing the set of engagement metrics in the first recipient profile.

6. The method of claim 1:
wherein receiving the query from the first computing device comprises receiving the query from the first computing device at a first time;
further comprising accessing a set of query characteristics corresponding to the query, the set of query characteristics comprising:
a timestamp corresponding to the first time; and
a first device identifier associated with the first computing device; and
wherein predicting the first intent of the first target recipient based on the first scan event comprises predicting the intent of the first target recipient based on the set of query characteristics and the first scan event.

7. The method of claim 6, further comprising, at a second time succeeding the first time, in response to a second scan event, initiated at the first computing device, that captures the first identifier:
receiving a second query for advertising content from the first computing device, the second query specifying the first identifier;
accessing a second set of query characteristics corresponding to the second query, the second set of query characteristics comprising a second timestamp corresponding to the second time and the first device identifier associated with the first computing device;
calculating a duration between the first scan event and the second scan event based on the first timestamp and the second timestamp; and
in response to the duration falling below a duration threshold:
selecting generating a second set of customized digital advertising content for presenting to the first target recipient within a second instance of the electronic document; and
triggering the first computing device to navigate to the second instance of the electronic document for presentation of the second set of customized digital advertising content to the first target recipient based on the pointer.

8. The method of claim 6:
wherein receiving the first query from the first computing device comprises, at the first time, receiving the first query from the first computing device accessed by a first user at the first time;
wherein accessing the set of recipient characteristics stored in the first recipient profile in response to the first recipient code corresponding to the first recipient profile further comprises:
linking the first device identifier to the first recipient profile; and
accessing the set of recipient characteristics stored in the first recipient profile;
further comprising, at a second time succeeding the first time, in response to a second scan event, initiated at the first computing device accessed by a second user, that captures the first identifier:
receiving a second query for advertising content, specifying the first identifier, from the first computing device;
accessing a second set of query characteristics corresponding to the second query, the second set of query characteristics comprising a second timestamp, corresponding to the second time, and the first device identifier corresponding to the first computing device;
in response to the first device identifier corresponding to the first recipient profile, identifying the second user as the first target recipient;
based on the first scan event, the second scan event, and the set of recipient characteristics, generating a second set of customized digital advertising content for presentation to the first target recipient within a second instance of the electronic document; and
triggering the first computing device to navigate to the second instance of the electronic document based on the pointer.

9. The method of claim 1:
wherein receiving the query specifying the first identifier from the first computing device comprises receiving the query specifying the first identifier from the first computing device, the first identifier comprising an advertisement code linked to a promotion associated with the sender of the set of advertisement cards; and defining a time limit defined for the promotion by the sender; and
wherein triggering the first computing device to navigate to the first instance of the electronic document comprises:
initiating a timer for a duration corresponding to the time limit; and
rendering the timer and the set of customized digital advertising content within the first instance of the electronic document;
triggering the first computing device to navigate to the first instance of the electronic document; and
in response to expiration of the timer, deactivating the promotion associated with the advertising campaign.

10. The method of claim 1, wherein generating the set of advertisement cards comprises:
generating the set of identifiers for placement on the set of advertisement cards, each identifier, in the set of identifiers, comprising the pointer and a particular recipient code in the set of recipient codes;
assigning each advertisement card, in the set of advertisement cards, with a particular identifier, in the set of identifiers, linked to a particular target recipient in the set of target recipients; and
triggering a robotic system to print the set of advertisement cards, each advertisement card, in the set of advertisement cards, addressed to a particular target recipient, in the set of target recipients, based on a set of contact information stored in the recipient profile and the particular identifier, for delivery to the target recipient via physical mailing.

11. The method of claim 1:
wherein receiving the query specifying the first identifier from the first computing device comprises receiving the query specifying the first identifier from the first computing device, the first identifier comprising an advertisement code specifying a format of the first advertisement card; and
further comprising:
deriving a first engagement metric based on the first scan event, the first engagement metric representing engagement of the first target recipient with printed content presented in the first advertisement card;
linking the first engagement metric to the format of the first advertisement card in a first engagement packet; and
storing the first engagement packet in an advertisement card profile, in a set of advertisement card profiles, associated with the first advertisement card; and wherein generating the notification indicating confirmation of the first scan event comprises generating the notification indicating confirmation of the first scan event and engagement of the first target recipient with the first advertisement card defining the format.

12. A method for tracking recipient interactions with advertising mail comprising, at a computer system:
during a setup period:
generating a set of advertisement cards for mailing to a set of target recipients, each advertisement card, in the set of advertisement cards, comprising printed advertising content associated with a sender of the set of advertisement cards and an identifier, in a set of identifiers, printed on the advertisement card and comprising:
a recipient code, in a set of recipient codes, printed on the advertisement card; and
a first pointer to an electronic document associated with the set of advertisement cards; and
for each recipient code, in the set of recipient codes, linking the recipient code to a recipient profile, in a set of recipient profiles, affiliated with a target recipient, in the set of target recipients, to associate a corresponding identifier, in the set of identifiers, with the target recipient; and
during a first time period:
in response to a first scan event, initiated at a first computing device, remote from the computer system, that captures a first identifier, in the set of identifiers, printed on a first advertisement card in the set of advertisement cards:
receiving a first query for advertising content from the first computing device, the first query specifying the first identifier comprising:
the first pointer; and
a first recipient code in the set of recipient codes;
in response to the first recipient code corresponding to accessing a first recipient profile, in the set of recipient profiles, affiliated with a first target recipient in the set of target recipients:
accessing a first set of recipient characteristics specified by the first recipient profile;
deriving a first engagement metric, for the first target recipient interacting with the first advertisement card, based on the first scan event;
assembling a first set of digital advertising content for presentation to the first target recipient based on the first set of recipient characteristics and the first engagement metric, the first set of digital advertising content comprising content unique to the first target recipient;
triggering the first computing device to navigate to a first instance of the electronic document, loaded with the first set of digital advertising content, based on the first pointer; and
storing the first engagement metric in the first recipient profile; and
during a second time period succeeding the first time period:
in response to a second scan event, initiated at the first computing device, that captures the first identifier:
receiving a second query for advertising content from the first computing device, the second query comprising the first pointer and the first recipient code corresponding to the first recipient profile;
deriving a second engagement metric, for the first target recipient interacting with the first advertisement card, based on the second scan event;
assembling a second set of digital advertising content for presentation to the first target recipient based on the first set of recipient characteristics, the first engagement metric, and the second engagement metric, the second set of digital advertising content comprising content unique to the first target recipient and distinct from the first set of digital advertising content; and
triggering the first computing device to navigate to a second instance of the electronic document, loaded with the second set of digital advertising content, based on the first pointer.

13. The method of claim 12:
wherein accessing the first set of recipient characteristics comprises accessing the first set of recipient characteristics comprising a first set of contact information corresponding to the first target recipient; and
further comprising, during the second time period:
based on the first identifier, accessing a second set of contact information corresponding to the sender of the set of advertisement cards;
generating a notification indicating confirmation of the first scan event and the second scan event and comprising the first set of contact information corresponding to the first target recipient; and
based on the second set of contact information, transmitting the notification to a second computing device, remote from the computer system, affiliated with the sender for review by the sender.

14. The method of claim 12, further comprising:
during the first time period:
accessing a first set of query characteristics corresponding to the first query comprising:
a first location of the first computing device during the first scan event; and
a first device identifier associated with the first computing device;
linking the first device identifier to the first recipient profile associated with the first target recipient; and
during a third time period:
in response to a third scan event that captures the first identifier at a second computing device accessed by a second user, receiving a third query specifying the first identifier from the second computing device;
accessing a second set of query characteristics corresponding to the third query and comprising:
a second location of the second computing device for the third scan event; and
a second device identifier associated with the second computing device;
calculating a distance between the first location of the first computing device and the second location of the second computing device;
in response to the distance falling below a distance threshold, linking the second device identifier to the first recipient profile associated with the first target recipient.

15. The method of claim 12:
further comprising during an initial time period preceding the first time period:
serving a set of advertising experiences, comprising digital advertising content, for presentation to a population of computing devices accessed by a population of users;

receiving a corpus of engagement data representing interactions of users in the population of users with the set of advertising experiences;

accessing a set of user profiles, each user profile in the set of user profiles comprising a set of user characteristics associated with a user in the population of users; and deriving an intent model based on the corpus of engagement data and the set of user characteristics;

wherein assembling the customized advertising experience for presentation to the target recipient comprises assembling the customized advertising experience for presentation to the target recipient within the first instance of the electronic document, based on the intent model, the set of recipient characteristics, and the first engagement metric; and wherein assembling the second set of digital advertising content for presentation to the first target recipient comprises assembling the second set of digital advertising content for presentation to the first target recipient based on the intent model, the first set of recipient characteristics, the first engagement metric, and the second engagement metric.

16. A method for tracking recipient interactions with advertising mail comprising, at a computer system:

during a setup period:
generating first identifier, in a set of identifiers, for placement on a first advertisement card, in a set of advertisement cards, associated with an advertising campaign, the identifier comprising:
a pointer to an electronic document associated with the advertising campaign; and
a first recipient code;
linking the first recipient code to a recipient profile, in a set of recipient profiles, affiliated with a target recipient of the first advertisement card to associate the first identifier with the target recipient; and
triggering a robotic system to print the first advertisement card comprising a set of printed advertising content and the first identifier, printed on the first advertisement card, for mailing to the target recipient; and during a first time period succeeding the setup period:
in response to a scan event that captures the first identifier at a computing device remote from the computer system and accessed by the target recipient, receiving a query from the computing device, the query specifying the first identifier comprising the pointer and the first recipient code;
based on to the first recipient code, retrieving a set of recipient characteristics corresponding to the target recipient and stored in the recipient profile;
generating a customized advertising experience for presenting within a first instance of the electronic document based on the set of recipient characteristics; and
triggering the computing device to navigate to the first instance of the electronic document based on the pointer.

17. The method of claim 16:
wherein generating the first identifier in the set of identifiers comprises generating the first identifier in the set of identifiers, for placement on the first advertisement card in the set of advertisement cards, the first identifier comprising:
the pointer to the electronic document associated with the first advertisement card; and
an encrypted recipient code linked to the target recipient of the first advertisement card, the encrypted recipient code comprising the set of recipient characteristics associated with the target recipient; and
further comprising, during the first time period:
decrypting the encrypted recipient code to access the set of recipient characteristics associated with the target recipient; and
identifying the target recipient based on the decrypted recipient code.

18. The method of claim 16:
wherein generating the first identifier in the set of identifiers comprises:
receiving a first query for a card print file to pair with a first template card, in a set of template cards, generated for a print order and loaded at a robotic system;
identifying a first card identifier, in a set of card identifiers, printed on the first template card;
accessing a first envelope identifier, in a set of envelope identifiers, linked to the first card identifier in the set of card identifiers; and
selecting a first recipient, from a list of recipients defined for the print order, for assigning to the first card identifier; and
wherein further comprising, in response to confirming printing of the first identifier on the advertisement card:
linking the first card identifier and the first envelope identifier to a first mailer profile, in a set of mailer profiles, associated with the first recipient;
retrieving a first card print file, in a set of card print files generated for the print order, stored in the first mailer profile and corresponding to recipients in the list of recipients;
receiving a second query for an envelope identifier, in the set of envelope identifiers, for printing on a first template envelope, in a set of template envelopes, paired with the first advertisement card;
retrieving the first envelope identifier linked to the first card identifier;
triggering printing of the first envelope identifier on the first template envelope; and
retrieving a first envelope print file, in the set of print files, stored in the first mailer profile.

19. The method of claim 18, wherein flagging the first advertisement card for delivery to the target recipient via physical mailing comprises:
loading the first card print file onto the robotic system for pairing with the first template card to print the first advertisement card according to the first card print file;
loading the first envelope print file onto the robotic system for pairing with the first template envelope for printing of a first addressed envelope according to the first envelope print file; and
inserting the first advertisement card into the first addressed envelope for delivery to the target recipient via physical mail.

* * * * *